(12) United States Patent
Masuda et al.

(10) Patent No.: US 11,973,185 B2
(45) Date of Patent: Apr. 30, 2024

(54) METHOD FOR PRODUCING SULFIDE SOLID ELECTROLYTE

(71) Applicant: IDEMITSU KOSAN CO., LTD., Tokyo (JP)

(72) Inventors: Naoya Masuda, Yokohama (JP); Atsushi Yao, Sodegaura (JP); Akito Takashima, Sodegaura (JP); Takehiro Fujita, Chiba (JP); Yusuke Iseki, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 227 days.

(21) Appl. No.: 17/313,044

(22) Filed: May 6, 2021

(65) Prior Publication Data
US 2021/0351434 A1    Nov. 11, 2021

(30) Foreign Application Priority Data

May 7, 2020   (JP) ................................ 2020-082064

(51) Int. Cl.
*H01M 10/0562*   (2010.01)
*H01M 10/0525*   (2010.01)

(52) U.S. Cl.
CPC ... *H01M 10/0562* (2013.01); *H01M 10/0525* (2013.01); *H01M 2220/30* (2013.01); *H01M 2300/0068* (2013.01)

(58) Field of Classification Search
CPC ......... H01M 10/0562; H01M 10/0525; H01M 2220/30; H01M 2300/0068
See application file for complete search history.

(56) References Cited

U.S. PATENT DOCUMENTS

| 2016/0028104 A1* | 1/2016 | Liang ................ H01M 10/0525 423/467 |
| 2017/0155170 A1* | 6/2017 | Sato ........................ C03C 10/00 |
| 2021/0075058 A1* | 3/2021 | Nakayama ............ H01B 1/122 |

FOREIGN PATENT DOCUMENTS

| JP | 2014096391 A | * | 5/2014 | |
| JP | 2014191899 A |   | 10/2014 | |
| WO | WO-2014192309 A1 | | 12/2014 | |
| WO | WO-2017159667 A1 | | 9/2017 | |
| WO | WO-2018054709 A1 | | 3/2018 | |
| WO | WO-2019131725 A1 | * | 7/2019 | ............. C01B 25/14 |

OTHER PUBLICATIONS

"Li4PS4I: A Li+ Superionic Conductor Synthesized by a Solvent-Based Soft Chemistry Approach", Chemistry of Materials, 2017, No. 29, p. 1830-1835.

* cited by examiner

*Primary Examiner* — Christopher P Domone
*Assistant Examiner* — Jonathan William Estes
(74) *Attorney, Agent, or Firm* — Element IP, PLC.

(57) ABSTRACT

Provided is a method for producing a sulfide solid electrolyte having a high purity as side reaction hardly occurs, and having a high ionic conductivity, in a simplified manner.
The method is for producing a sulfide solid electrolyte containing a lithium atom, a sulfur atom, a phosphorus atom and a halogen atom, comprising separately preparing a complex (1) containing a sulfide that contains a lithium atom, a sulfur atom and a phosphorus atom, as a constituent element, and a complex (2) containing a halide that contains a lithium atom and a halogen atom, as a constituent element, and mixing the complex (1) and the complex (2).

16 Claims, 10 Drawing Sheets

METHOD FOR PRODUCING SULFIDE SOLID ELECTROLYTE

TECHNICAL FIELD

The present invention relates to a method for producing a sulfide solid electrolyte.

BACKGROUND ART

With rapid spread of information-related instruments, communication instruments, and so on, such as personal computers, video cameras, and mobile phones, in recent years, development of batteries that are utilized as a power source therefor is considered to be important. Heretofore, in batteries to be used for such an application, an electrolytic solution containing a flammable organic solvent has been used. However, development of batteries having a sulfide solid electrolyte layer in place of an electrolytic solution is being made in view of the fact that by making the battery fully solid, simplification of a safety unit may be realized without using a flammable organic solvent within the battery, and the battery is excellent in manufacturing costs and productivity.

A production method of a sulfide solid electrolyte to be used for a sulfide solid electrolyte layer is roughly classified into a solid-phase method and a liquid-phase method. Furthermore, as for the liquid-phase method, there are a homogeneous method in which a sulfide solid electrolyte material is completely dissolved in a solvent; and a heterogeneous method in which a sulfide solid electrolyte material is not completely dissolved in a solvent but undergoes through a suspension of solid-liquid coexistence. For example, as the solid-phase method, a method in which raw materials, such as lithium sulfide and diphosphorus pentasulfide are subjected to mechanical milling treatment using an apparatus, such as a ball mill and a bead mill and optionally subjected to heat treatment, thereby producing an amorphous or crystalline sulfide solid electrolyte is known (see, for example, PTL 1). In accordance with this method, the sulfide solid electrolyte is obtained by applying a mechanical stress to the raw materials, such as lithium sulfide, to promote the reaction of the solids with each other.

On the other hand, as for the homogenous method regarding the liquid-phase method, a method in which a sulfide solid electrolyte is dissolved in a solvent and redeposited is known (see, for example, PTL 2). In addition, as for the heterogeneous method, a method in which sulfide solid electrolyte raw materials, such as lithium sulfide, are allowed to react in a solvent containing a polar aprotic solvent is known (see, for example, PTLs 3 and 4 and NPL 1). For example, PTL 4 discloses that a production method of a sulfide solid electrolyte having an $Li_4PS_4I$ structure includes a step in which dimethoxyethane (DME) is used and bound with the $Li_3PS_4$ structure, to obtain $Li_4PS_4 \cdot DME$. The obtained sulfide solid electrolyte has an ionic conductivity of $5.5 \times 10^{-5}$ S/cm ($3.9 \times 10^{-4}$ S/cm in the calcium-doped product). Toward practical use of an all-solid-state battery, the liquid-phase method is recently watched as a method in which it can be synthesized simply and in large amounts in addition to versatility and applicability.

CITATION LIST

Patent Literature

[PTL 1] WO 2017/159667 A
[PTL 2] JP 2014-191899 A
[PTL 3] WO 2014/192309 A
[PTL 4] WO 2018/054709 A

Non-Patent Literature

[NPL 1] CHEMISTRY OF MATERIALS, 2017, No. 29, pp. 1830-1835

SUMMARY OF INVENTION

Technical Problem

However, as for the conventional solid-phase method accompanied with mechanical milling treatment or the like, the solid-phase reaction is the center, and the sulfide solid electrolyte is readily obtained in a high purity, and thus, a high ionic conductivity can be realized. However, this has a problem that the reaction time is long.

As for the liquid-phase method, for the reasons that the decomposition or the lattice defect of sulfide solid electrolyte is generated during the evaporation of the solvent, it was difficult to realize a high ionic conductivity as compared with the solid-phase synthesis method.

For example, according to the homogenous method, the raw materials or the sulfide solid electrolyte is once completely dissolved, and thus, the components can be homogenously dispersed in the liquid. But, in the subsequent deposition step, the deposition proceeds according to an inherent solubility of each of the components, and thus, it is extremely difficult to perform the deposition while keeping the dispersed state of the components. As a result, each of the components is separately deposited. In addition, according to the homogenous method, an affinity between the solvent and lithium becomes excessively strong, and therefore, even by drying after deposition, the solvent hardly comes out from the solid electrolyte. For these matters, the homogenous method involves such a problem that the ionic conductivity of the sulfide solid electrolyte is largely lowered.

In addition, even in the heterogeneous method of solid-liquid coexistence, a part of the sulfide solid electrolyte is dissolved, and thus, a separation takes place owing to the elution of the specified component, so that it is difficult to obtain a desired sulfide solid electrolyte.

In view of the aforementioned circumstances, the present invention has been made, and an object thereof is to provide a method for producing a sulfide solid electrolyte having an extremely high purity as side reaction hardly occurs, and having a high ionic conductivity, in a simplified manner.

Solution to Problem

In order to solve the aforementioned problem, the present inventors made extensive and intensive investigations and, as a result, have found the following matters and have completed the present invention.

1. By separately preparing a complex (1) to be mentioned below and a complex (2) to be mentioned below, a sulfide solid electrolyte hardly inducing side reaction, capable of preventing a halogen atom from dissolving out of crystals and having a high ionic conductivity can be obtained.
2. By mixing a complex (1) to be mentioned below and a complex (2) to be mentioned below, the complex (1) and the complex (2) react rapidly to give a sulfide solid electrolyte having a high ionic conductivity, in a simplified manner.

Specifically, the present invention provides the following [1] to [17].

[1] A method for producing a sulfide solid electrolyte containing a lithium atom, a sulfur atom, a phosphorus atom and a halogen atom, including separately preparing a complex (1) containing a sulfide that includes a lithium atom, a sulfur atom and a phosphorus atom, as a constituent element, and a complex (2) containing a halide that includes a lithium atom and a halogen atom, as a constituent element, and mixing the complex (1) and the complex (2).

[2] The method for producing a sulfide solid electrolyte according to [1], including further heating after mixing the complex (1) and the complex (2).

[3] The method for producing a sulfide solid electrolyte according to [2], wherein the heating is carried out at 90 to 250° C.

[4] The method for producing a sulfide solid electrolyte according to [2], wherein the heating is carried out at 0.1 to 100.0 Pa.

[5] The method for producing a sulfide solid electrolyte according to [1], wherein the mixing is carried out in a solvent.

[6] The method for producing a sulfide solid electrolyte according to [1], wherein the mixing is carried out using a pulverizer.

[7] The method for producing a sulfide solid electrolyte according to [1], wherein the sulfide contains an amorphous $Li_3PS_4$ or a crystalline $Li_3PS_4$.

[8] The method for producing a sulfide solid electrolyte according to [1], wherein the complex (1) further contains a complexing agent (1) as a constituent element, and the complex (2) further contains a complexing agent (2) as a constituent element.

[9] The method for producing a sulfide solid electrolyte according to [8], wherein the complexing agent (1) and the complexing agent (2) each independently contain a hetero atom-containing compound.

[10] The method for producing a sulfide solid electrolyte according to [8], wherein the complexing agent (1) and the complexing agent (2) each independently contain a compound having at least one amino group or ether bond.

[11] The method for producing a sulfide solid electrolyte according to [8], wherein the complexing agent (1) and the complexing agent (2) each independently contain a compound having at least 2 tertiary amino groups in the molecule.

[12] The method for producing a sulfide solid electrolyte according to [8], wherein, by mixing the complex (1) and the complex (2), a precursor containing the complexing agent (1), the complexing agent (2), a lithium atom, a sulfur atom, a phosphorus atom and a halogen atom as constituent components is obtained.

[13] The method for producing a sulfide solid electrolyte according to [12], wherein the total content of the complex (1) and the complex (2) in the precursor is 30 to 80% by mass on the total amount of the precursor.

[14] The method for producing a sulfide solid electrolyte according to [5], wherein the solvent is at least one kind of solvent selected from an aliphatic hydrocarbon solvent, an alicyclic hydrocarbon solvent, an aromatic hydrocarbon solvent and an ether solvent.

[15] The method for producing a sulfide solid electrolyte according to [5], wherein the solvent is used in an amount of 5 to 50 mL relative to 1 g of the total mass of the complex (1) and the complex (2).

[16] The method for producing a sulfide solid electrolyte according to [1], wherein the sulfide solid electrolyte contains a thio-LISICON Region II-type crystal structure.

[17] The method for producing a sulfide solid electrolyte according to [1], wherein the sulfide solid electrolyte does not have a diffraction peak at $2\theta=17.5°$ and $26.1°$ corresponding to a crystalline $Li_3PS_4$, in X-ray diffractometry using a CuKα ray.

Advantageous Effects of Invention

According to the present invention, there can be provided a method for producing a sulfide solid electrolyte having an extremely high purity as side reaction hardly occurs, and having a high ionic conductivity, in a simplified manner.

DESCRIPTION OF EMBODIMENTS

Figure 1:
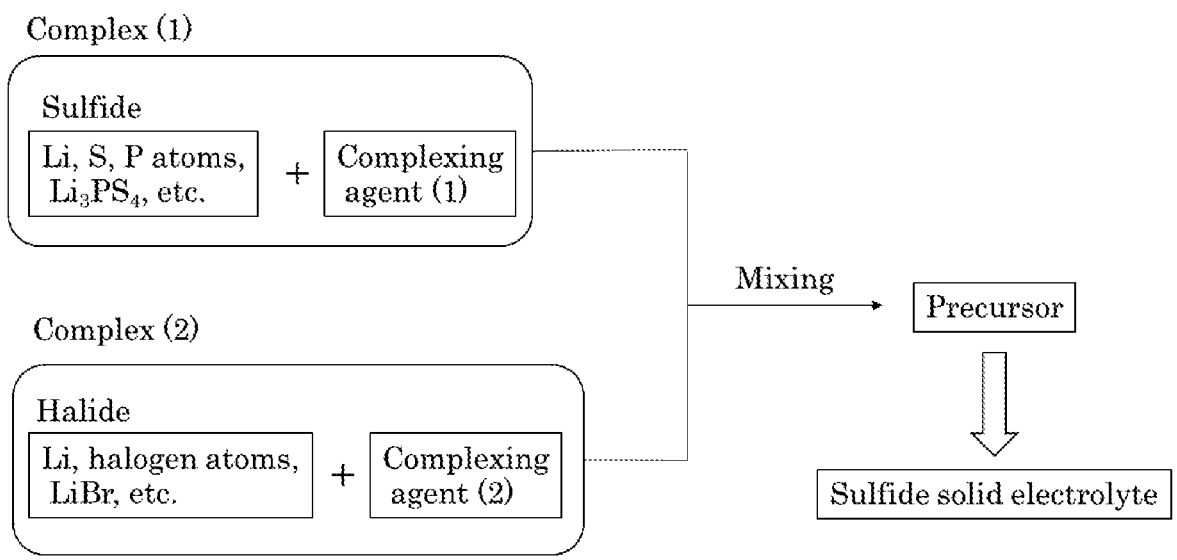
FIG. 1 This is a flow chart of explaining one example of a preferred mode of a production method of the present embodiment.

Embodiments of the present invention (hereinafter sometimes referred to as "present embodiment") are hereunder described. In this specification, numerical values of an upper limit and a lower limit according to numerical value ranges of "or more", "or less", and "XX to YY" are each a numerical value which can be arbitrarily combined, and numerical values of the section of Examples can also be used as numerical values of an upper limit and a lower limit, respectively.

[Production Method for Sulfide Solid Electrolyte]

The production method for a sulfide solid electrolyte of the present embodiment is a production method including separately preparing a complex (1) containing a sulfide that includes a lithium atom, a sulfur atom and a phosphorus atom and optionally a complexing agent (1), as constituent elements, and a complex (2) containing a halide that includes a lithium atom and a halogen atom and optionally a complexing agent (2), as constituent elements, and mixing the complex (1) and the complex (2).

In this specification, "contain" and "contain as a constituent element" include a case of "containing" as it is literally, and also a case of "containing" as bonding to any other atom or molecule, for example, a case where at least one atom that constitutes a compound to be mixed bonds to at least one atom that constitutes another compound, while the constitution of that compound to be mixed is kept remained as it is.

The "sulfide solid electrolyte" as referred to in this specification means an electrolyte of keeping the solid state at 25° C. in a nitrogen atmosphere. The sulfide solid electrolyte in the present embodiment is a sulfide solid electrolyte containing a lithium atom, a sulfur atom, a phosphorus atom, and a halogen atom and having an ionic conductivity to be caused owing to the lithium atom.

In the "sulfide solid electrolyte", both of a crystalline sulfide solid electrolyte having a crystal structure and an amorphous sulfide solid electrolyte, which are obtained by the production method of the present embodiment, are included. The crystalline sulfide solid electrolyte as referred to in this specification is a material that is a sulfide solid electrolyte in which peaks derived from the sulfide solid electrolyte are observed in an X-ray diffraction pattern, and the presence or absence of peaks derived from the raw materials of the sulfide solid electrolyte does not matter. That is, the crystalline sulfide solid electrolyte contains a crystal structure derived from the sulfide solid electrolyte, in which a part thereof may be a crystal structure derived from the sulfide solid electrolyte, or all of them may be a crystal structure derived from the sulfide solid electrolyte. The crystalline sulfide solid electrolyte may be one in which an amorphous sulfide solid electrolyte is contained in a part thereof so long as it has the X-ray diffraction pattern as mentioned above. In consequence, in the crystalline sulfide solid electrolyte, a so-called glass ceramics which is obtained by heating the amorphous sulfide solid electrolyte to a crystallization temperature or higher is contained.

The amorphous sulfide solid electrolyte as referred to in this specification is a halo pattern in which other peak than the peaks derived from the materials is not substantially observed in an X-ray diffraction pattern in the X-ray diffractometry, and it is meant that the presence or absence of peaks derived from the raw materials of the sulfide solid electrolyte does not matter.

The production method for a sulfide solid electrolyte of the present embodiment includes mixing a complex (1) to be mentioned below and a complex (2) to be mentioned below, as shown in FIG. 1, and may optionally include any other step of drying to be mentioned below. Preferably, a complex (1) and a complex (2) are mixed to give a precursor to be mentioned below.

Though details of the precursor will be described below, it is desirable that the precursor is one prepared by mixing a complex (1) and a complex (2) each complexed with a complexing agent (a complexing agent (1) and a complexing agent (2) to be mentioned below). The complexing agents are removed by drying to give a sulfide solid electrolyte. Accordingly, in this specification, one prepared by mixing the complexes (1) and (2) is referred to as "precursor". Preferably, the "precursor" contains the complexing agent (1) and the complexing agent (2) as constituent components, which will be described below.

For the reason that a sulfide solid electrolyte hydrolyzes by contact with water such as moisture in air, a sulfide solid electrolyte may effuse hydrogen sulfide. In consequence, it is an ideal that a production process of a sulfide solid electrolyte or a battery is performed in a low dew point environment with less moisture; however, it is difficult economically and physically to perform all of steps at a high dew point, and actually, it is required to handle the sulfide solid electrolyte at a high dew point (for example, (dew point)−60° C. to −20° C.) in a dry room level.

According to the production method of the present invention, production is possible at a high dew point, and therefore the present invention exhibits an excellent effect in scaling up the production process.

<Mixing>

Not specifically limited, the mixing mode in the present embodiment may be any one capable of mixing the complex (1) and the complex (2), and may be any of a liquid-phase mixing method or a solid-phase mixing method. The liquid-phase method may be a homogeneous method of completely dissolving a sulfide solid electrolyte material in a solvent and mixing it therein, or a heterogeneous method of mixing a sulfide solid electrolyte material not completely dissolving the material but via a suspension of solid-liquid coexistence.

From the viewpoint that granulation to increase a particle size does not occur in a mixing step but production at a low temperature in a simple apparatus is possible, the mixing is preferably carried out in a solvent line in a homogeneous method or a heterogeneous method, and from the viewpoint of attaining a high ionic conductivity and from the viewpoint of reducing an environmental load accompanied by using a solvent, a solid-phase method is preferred.

The complex (1) and the complex (2) may be solid or liquid, but generally these are solid or slurry as will be mentioned below.

The method of mixing the complex (1) and the complex (2) is not specifically limited, and the complex (1) and the complex (2) separately prepared may be put into an apparatus and mixed therein, in which the complex (1) and the complex (2) can be mixed therein. For shortening the mixing time and for obtaining homogeneous complex (1) and complex (2), the mixing is preferably carried out in a solvent as will be mentioned below.

The production method for a sulfide solid electrolyte in the present embodiment includes mixing the complex (1) and the complex (2). The apparatus for mixing is not specifically limited so far as it enables at least mixing therein, but a pulverizer is preferably used. For example, an instrument to be used for the purpose of pulverization of solid raw materials, which is generally called a pulverizer, such as a medium type pulverizer, e.g., a ball mill and a bead mill can be used, or mixing may be carried out in a solvent, for example, using a mechanical stirring mixer equipped with a stirring impeller in a tank.

The pulverizer which is used for pulverization is not particularly restricted so long as it is able to pulverize particles, and for example, a medium type pulverizer using a pulverization medium can be used. Among medium type pulverizers, taking into account the fact that the precursor is in a liquid state or slurry state mainly accompanied by liquids, such as the complexing agent and the solvent, a wet-type pulverizer capable of coping with wet pulverization is preferred.

Representative examples of the wet-type pulverizer include a wet-type bead mill, a wet-type ball mill, and a wet-type vibration mill, and a wet-type bead mill using beads as a pulverization medium is preferred from the standpoint that it is able to freely adjust the condition of a pulverization operation and is easy to cope with materials having a smaller particle diameter. In addition, a dry-type pulverizer, such as a dry-type medium type pulverizer, e.g., a dry-type bead mill, a dry-type ball mill, and a dry-type vibration mill, and a dry-type non-medium pulverizer, e.g., a jet mill, can also be used.

Depending on the amount of the mixture, mixing can also be carried out using a mortar.

In the case where the precursor to be mixed with a pulverizer is in a slurry state, a flow pulverizer that enables circulation driving optionally with circulation is preferred. More specifically, it is preferred to use a pulverizer of a mode of circulating the precursor slurry between a pulverizer (pulverization mixer) of pulverizing the slurry and a temperature-holding tank (reactor) as disclosed in JP 2010-140893 A.

The size of the bead which is used for the pulverizer may be appropriately selected according to the desired particle diameter and treatment amount and the like, and for example, it may be about 0.05 mmφ or more and 5.0 mmφ or less, and it is preferably 0.1 mmφ or more and 3.0 mmφ or less, and more preferably 0.3 mmφ or more and 1.5 mmφ or less in terms of a diameter of the bead.

As the material of beads for use in the pulverizer, titania, alumina or zirconia can be appropriately selected.

Examples of the mechanical agitation type mixer include a high-speed agitation type mixer and a double arm type mixer, and a high-speed agitation type mixer is preferably used from the viewpoint of increasing the homogeneity of raw materials in the mixture of a sulfide and a halide (hereinafter also referred to as a raw material inclusion) and a complexing agent to attain a higher ionic conductivity. Examples of the high-speed agitation type mixer include a vertical axis rotating type mixer and a lateral axis rotating type mixer, and mixers of any of these types may be used.

Examples of a shape of the impeller which is used in the mechanical agitation type mixer include a blade type, an arm type, a ribbon type, a multistage blade type, a double arm type, a shovel type, a twin-shaft blade type, a flat blade type, and a C type blade type. From the viewpoint of increasing the homogeneity of raw materials in the raw material inclusion and obtaining a higher ionic conductivity, a shovel type, a flat blade type, a C type blade type, and the like are preferred.

Depending on the amount of the mixer, stirring may be carried out with a mechanical stirrer using a stirring impeller.

The temperature condition in mixing the complex (1) and the complex (2) is not specifically limited, and is, for example, −30 to 100° C., preferably −10 to 50° C., more preferably room temperature (23° C.) or so (for example, room temperature±5° C. or so).

In a solid-phase method, the mixing time may be 0.1 to 150 hours or so, and is, from the viewpoint of more uniformly mixing to attain a higher ionic conductivity, preferably 1 to 120 hours, more preferably 2 to 100 hours.

In a liquid-phase method, the mixing time is preferably 1 to 100 hours or so, and in the case where the complexing agent that is a constituent component of the complex is an amine compound to be mentioned below, the mixing time is, from the viewpoint of more uniformly mixing to attain a higher ionic conductivity, preferably 1 to 50 hours, more preferably 2 to 10 hours. In the case where the complexing agent that is a constituent component of the complex is any other than an amine compound to be mentioned below, for example, an ether compound, the mixing time is, from the viewpoint of more uniformly mixing to attain a higher ionic conductivity, preferably 20 to 90 hours, more preferably 30 to 80 hours.

By mixing the complex (1) containing a sulfide that includes a lithium atom, a sulfur atom and a phosphorus atom as a constituent element, and the complex (2) containing a halide that includes a lithium atom and a halogen atom as a constituent element, reaction between the lithium atom, the sulfur atom, the phosphorus atom and the halogen atom with the complexing agent contained in the complex (1) and the complex (2) is promoted. Accordingly, the atoms contained in the sulfide and the halide can bond to each other via and/or directly not via the complexing agent to give a precursor. Specifically, in the production method for a sulfide solid electrolyte of the present embodiment, the precursor formed by mixing the complex (1) and the complex (2) is composed of a complexing agent, a lithium atom, a sulfur atom, a phosphorus atom and a halogen atom, and by mixing the complex (1) and the complex (2) mentioned above, a precursor inclusion can be produced.

As in the above, by separately preparing the complex (1) and the complex (2) and mixing them, a halogen atom and a sulfur atom can be taken in the precursor as mentioned above. Further, by separately preparing the complex (1) and the complex (2), a side product can be suppressed and, in addition, a side product in producing the complex (1) and a side product in producing the complex (2) can be removed, and accordingly, the purity of the precursor can be thereby increased. In addition, the complex-to-complex reaction between the complex (1) and the complex (2) can shorten the reaction time.

In the present embodiment, the precursor prepared by mixing in a solvent is generally in the form of a suspension (slurry) that contains a solid of the precursor, and thereafter this may be powdered in a subsequent drying step to be mentioned below.

<Complex (1)>

The complex (1) in the present embodiment contains a sulfide that will be mentioned below as a constituent element, and may further contain a complexing agent (1) also to be mentioned below, as a constituent element.

One alone or two or more kinds of these constituent elements may be used either singly or as combined.

Preferably, the complex (1) contains an amorphous $Li_3PS_4$ or a crystalline $Li_3PS_4$.

The content of the complexing agent (1) in the complex (1) is, from the viewpoint of obtaining a solid electrolyte having a high ionic conductivity, preferably 10% by mass or more on the total amount of the complex (1), more preferably 20% by mass or more, even more preferably 30% by mass or more, and is, from the viewpoint of crystal formation, preferably 80% by mass or less, more preferably 70% by mass or less, even more preferably 60% by mass or less.

The complex (1) is preferably granular, and the average particle size ($D_{50}$) of the particles is preferably 10 μm or ore and 2000 μm or less, more preferably 30 μm or more and 1500 μm or less, even more preferably 50 μm or more and 1000 μm or less.

In this specification, the average particle size ($D_{50}$) is a particle size such that, in drawing a particle size distribution cumulative curve and in successive cumulation from the particles having a smallest particle size, the particle size reaches 50% of all the particles, and the volume distribution indicates an average particle size that can be measured using, for example, a laser diffraction/scattering-type particle size distribution measuring apparatus. Preferably, the complex (2) to be mentioned below has an average particle size on the same level as that of the complex (1), that is, the average particle size of the complex (2) preferably falls within the same range as that of the average particle size of the complex (1).

(Sulfide)

The sulfide in the present embodiment contains a lithium atom, a sulfur atom and a phosphorus atom, and is preferably $Li_3PS_4$ containing a $PS_4$ structure. The production method of the present embodiment uses, as a raw material, a lithium-containing structure such as $Li_3PS_4$ existing in a solid electrolyte as a main structure, and therefore, as compared with the case of producing a sulfide solid electrolyte not via the sulfide in the present embodiment, like in PTL 3, in the production method of the present embodiment, the corresponding component ratio of the structure can be increased and the ionic conductivity can be therefore increased.

The sulfide in the present embodiment preferably contains an amorphous $Li_3PS_4$ or a crystalline $Li_3PS_4$.

Using the complex that contains the sulfide in the present embodiment as a constituent element and mixing the sulfide with the sulfide (2) to be mentioned below, a sulfide solid electrolyte in which a halogen atom is dispersed and fixed can be obtained more readily. As a result, a sulfide solid electrolyte having a high ionic conductivity can be obtained.

As a raw material for the sulfide, for example, a compound containing at least one selected from a lithium atom, a sulfur atom and a phosphorus atom can be used either singly or as a combination of two or more kinds thereof.

From the viewpoint of readily obtaining a sulfide solid electrolyte having a high ionic conductivity by using the complex having such a sulfide as a constituent element, the raw material includes lithium sulfide ($Li_2S$), and a phosphorus sulfide such as diphosphorus trisulfide ($P_2S_3$) and diphosphorus pentasulfide ($P_2S_5$), and a combination of raw materials is, for example, preferably a combination of lithium sulfide and diphosphorus pentasulfide.

In the case where $Li_3PS_4$ produced from lithium sulfide and diphosphorus pentasulfide is used as a sulfide, the proportion of lithium sulfide to the total of lithium sulfide and diphosphorus pentasulfide is, from the viewpoint of attaining a higher chemical stability and a higher ionic conductivity, preferably 70 to 80 mol %, more preferably 72 to 78 mol %, even more preferably 74 to 76 mol %.

As needed, a lithium compound such as lithium oxide, lithium hydroxide or lithium carbonate; an alkali metal sulfide such as sodium sulfide, potassium sulfide, rubidium sulfide or cesium sulfide; a metal sulfide such as silicon sulfide, germanium sulfide, boron sulfide, gallium sulfide, tin sulfide (SnS, $SnS_2$), aluminum sulfide or zinc sulfide; a phosphate compound such as sodium phosphate or lithium phosphate can also be used.

(Complexing Agent (1))

The production method for a sulfide solid electrolyte of the present embodiment uses, as complexing agents the complexing agent (1) and the complexing agent (2), and therefore the method is preferable since the complex (1) and the complex (2) can be readily prepared and a solid electrolyte having a high ionic conductivity can be produced therein.

The complexing agent (1) and the complexing agent (2) to be mentioned below may be the same or different, but are preferably the same.

In this specification, the complexing agent (the complexing agent (1) and the complexing agent (2) to be mentioned below) is a compound that forms a complex with a sulfide of a constituent element of the complex (1) or a compound that forms a complex with a halide of a constituent element of the complex (2). Preferably, this is a substance capable of forming a complex with a lithium atom, a phosphorus atom, a sulfur atom and a halogen atom, and is more preferably one having such a property that promotes formation of a precursor through reaction of a sulfide of a constituent element of the complex (1) and a halide of a constituent element of the complex (2), both containing a lithium atom contained in the precursor.

Not specifically limited, the complexing agent may be anyone having the above-mentioned property, and is, in particular, preferably a compound containing an atom having a high affinity to a lithium atom, for example, a hetero atom such as a nitrogen atom, an oxygen atom and a chlorine atom, more preferably a compound having a group that contains these hetero atoms. These hetero atoms and the group containing the hetero atom can coordinate (bond) with lithium.

The complexing agent is considered to have a property such that, the hetero atom in the molecule thereof has a high affinity to a lithium atom, and can bond to a lithium-containing structure such as $Li_3PS_4$ that contains a $PS_4$ structure typically existing as a main structure in the sulfide solid electrolyte to be obtained in the production method of the present embodiment, or to a lithium-containing raw material such as a lithium halide, thereby to readily form an aggregate. Consequently, by mixing the raw material inclusion and the complexing agent, a precursor with a halogen atom more effectively dispersed and fixed in the sulfide solid electrolyte can be obtained, in which an aggregate formed via a lithium-containing structure such as a $PS_4$ structure or a complexing agent, or an aggregate formed via a lithium-containing raw material such as a lithium halide or a complexing agent can exist evenly, and as a result, it is considered that a sulfide solid electrolyte having a high ionic conductivity and capable of suppressing generation of hydrogen sulfide can be obtained.

Consequently, as the complexing agent (1) and the complexing agent (2) for use herein, it is preferable that a hetero atom-having compound is separately and independently used.

Further, the compound preferably has at least two hetero atoms capable of forming a coordinate (bond) in the molecule, and more preferably has a group containing at least two such hetero atoms in the molecule. By mixing the complex (1) and the complex (2) each having a group containing at least two hetero atoms in the molecule, a sulfide of a constituent element of the complex (1), such as typically a lithium-containing structure such as $Li_3PS_4$ that contains a $PS_4$ structure, and a lithium-containing raw material of a constituent element of the complex (2) such as a lithium halide can be bonded via the at least two hero atoms in the molecule. Accordingly, the halogen atom can be more effectively dispersed and fixed in the precursor. As a result, a sulfide solid electrolyte having a high ionic conductivity and capable of suppressing generation of hydrogen sulfide can be obtained. Among the hetero atoms, an oxygen atom or a nitrogen atom is preferred, and a nitrogen atom is more preferred. In the case where the compound contains an oxygen atom, it has the atom via an ether bond in the molecule. As the nitrogen-containing group, an amino group is preferred, that is, the complexing agent is preferably an amine compound.

Consequently, it is preferable that the complexing agent (1) and the complexing agent (2) each independently contain a compound having at least one amino group or ether bond.

Not specifically limited, the amine compound may be anyone having an amino group in the molecule and capable of promoting formation of a precursor, but is preferably a compound having at least two amino groups in the molecule. Having such a structure, the compound can bond a lithium-containing sulfide such as a $PS_4$ structure-containing $Li_3PS_4$, and lithium such as a lithium halide, via at least two nitrogen atoms in the molecule, and accordingly, the halogen atom in the precursor can be more effectively dispersed and fixed in the precursor, and as a result, a sulfide solid electrolyte having a high ionic conductivity can be obtained.

Consequently, it is preferable that the complexing agent (1) and the complexing agent (2) each independently contain a compound having at least two tertiary amino groups in the molecule.

Examples of such an amine compound include an amine compound such as an aliphatic amine, an alicyclic amine, a heterocyclic amine, and an aromatic amine, and these can be used singly or as a mixture of two or more kinds thereof as combined.

More specifically, typical preferred examples of the aliphatic amine include aliphatic diamines, such as an aliphatic primary amine such as ethylenediamine, diaminopropane, and diaminobutane; an aliphatic secondary amine such as N,N'-dimethylethylenediamine, N,N'-diethylethylenediamine, N,N'-dimethyldiaminopropane, and N,N'-diethyldiaminopropane; an aliphatic tertiary diamine such as N,N,N',N'-tetramethyldiaminomethane, N,N,N',N'-tetramethylethylenediamine, N,N,N',N'-tetraethylethylenediamine, N,N,N',N'-tetramethyldiaminopropane, N,N,N',N'-tetraethyldiaminopropane, N,N,N',N'-tetramethyldiaminobutane, N,N,N',N'-tetramethyldiaminopentane, and N,N,N',N'-tetramethyldiaminohexane. Regarding exemplification as referred to in this specification, for example, a diaminobutane includes not only isomers relative to the position of the amino group, such as 1,2-diaminobutane, 1,3-diaminobutane and 1,4-diaminobutane, but also other all isomers such as linear or branched isomers relative to butane, unless otherwise specifically imidated.

The carbon number of the aliphatic amine is preferably 2 or more, more preferably 4 or more, even more preferably 6 or more, and the upper limit is preferably 10 or less, more preferably 8 or less, even more preferably 7 or less. The carbon number of the hydrocarbon group of the aliphatic hydrocarbon group in the aliphatic amine is preferably 2 or more, and the upper limit is preferably 6 or less, more preferably 4 or less, even more preferably 3 or less.

Typically, preferred examples of the alicyclic amine include alicyclic diamines, such as an alicyclic primary diamine such as cyclopropanediamine, and cyclohexanediamine; an alicyclic secondary diamine such as bisaminomethylcyclohexane; an alicyclic tertiary diamine such as N,N,N',N'-tetramethyl-cyclohexanediamine, and bis(ethylmethylamino)cyclohexane, and preferred examples of the heterocyclic amine include heterocyclic diamines, such as a heterocyclic primary diamine such as isophorone; a heterocyclic secondary diamine such as piperazine, and dipiperidylpropane; and a heterocyclic tertiary diamine such as N,N-dimethylpiperazine, and bismethylpiperidylpropane.

The carbon number of the alicyclic amine and the heterocyclic amine is preferably 3 or more, more preferably 4 or more, and the upper limit is preferably 16 or less, more preferably 14 or less.

Typically, preferred examples of the aromatic amine include aromatic diamines, such as an aromatic primary diamine such as phenyldiamine, tolylenediamine, and naphthalenediamine; an aromatic secondary diamine such as N-methylphenylenediamine, N,N'-dimethylphenylenediamine, N,N'-bismethylphenylphenylenediamine, N,N'-dimethylnaphthalenediamine, and N-naphthylethylenediamine; and an aromatic tertiary diamine such as N,N-dimethylphenylenediamine, N,N,N',N'-tetramethylphenylenediamine, N,N,N',N'-tetramethyldiaminodiphenylmethane, and N,N,N',N'-tetramethylnaphthalenediamine.

The carbon number of the aromatic amine is preferably 6 or more, more preferably 7 or more, even more preferably 8 or more, and the upper limit is preferably 16 or less, more preferably 14 or less, even more preferably 12 or less.

The amino compound for use in the present embodiment may be substituted with a substituent such as an alkyl group, an alkenyl group, an alkoxy group, a hydroxy group, or a cyano group, or with a halogen atom.

As specific examples, diamines are exemplified herein, but needless to say, the amine compound for use in the present embodiment is not limited to a diamine, and, for example, aliphatic monoamines corresponding to various diamines such as the above-mentioned aliphatic diamines of trimethylamine, triethylamine and ethyldimethylamine; as well as piperidine compounds such as piperidine, methylpiperidine, and tetramethylpiperidine, pyridine compounds such as pyridine, and picoline, morpholine compounds such as morpholine, methylmorpholine, and thiomorpholine, imidazole compounds such as imidazole, and methylimidazole, and also aliphatic monoamines that are monoamines corresponding to the above-mentioned alicyclic diamines, or other monoamines such as heterocyclic monoamines corresponding to the heterocyclic diamines, and aromatic monoamines corresponding to the aromatic diamines, and in addition thereto, polyamines having 3 or more amino groups, such as diethylenetriamine, N,N',N''-trimethyldiethylenetriamine, N,N,N',N'',N''-pentamethyldiethylenetriamine, triethylenetetramine, N,N'-bis[dimethylamino)ethyl]-N,N'-dimethylethylenediamine, hexamethylenetetramine, and tetraethylenepentamine, are also usable.

Among those described above, from the viewpoint of obtaining a higher ionic conductivity, tertiary diamines having a tertiary amino group as an amino group are preferred, and tertiary diamines having two tertiary amino groups are more preferred, tertiary diamines having two tertiary amino groups on the both ends are still more preferred, and aliphatic tertiary diamines having a tertiary amino group on the both ends are yet still more preferred. In the aforementioned amine compounds, as the aliphatic tertiary diamine having a tertiary amino group on the both ends, tetramethylethylenediamine, tetraethylethylenediamine, tetramethyldiaminopropane, and tetraethyldiaminopropane are preferred, and taking into account easiness of availability and so on, tetramethylethylenediamine and tetramethyldiaminopropane are preferred.

As the other complexing agent than the amine compound, for example, a compound having a group that contains a hetero atom such as an oxygen atom, or a halogen atom, e.g., a chlorine atom has a high affinity to a lithium atom, and therefore can be used as the other complexing agent than the above-mentioned amine compound. A compound having a group that contains a nitrogen atom as a hetero atom, except an amino group, for example, having a nitro group or an amide group, can also have the same effect.

A compound not having a nitrogen atom can also be used as the other complexing agent. Examples thereof include an alcohol solvent such as ethanol, and butanol; an ester solvent such as ethyl acetate, and butyl acetate; an aldehyde solvent such as formaldehyde, acetaldehyde, and dimethylformamide; a ketone solvent such as acetone, and methyl ethyl ketone; an ether solvent to be mentioned below; a halogen atom-containing aromatic hydrocarbon solvent such as trifluoromethylbenzene, nitrobenzene, chlorobenzene, chlorotoluene, and bromobenzene; and a solvent containing a carbon atom and a hetero atom, such as acetonitrile, dimethyl sulfoxide, and carbon disulfide.

Among these, an ether solvent is preferred, and examples thereof include ether compounds such as an aliphatic ether, an alicyclic ether, a heterocyclic ether, and an aromatic ether. The compound may have one ether bond in the molecule, or may have 2 or more ether bonds. From the viewpoint of the intensity of the coordinate bond to a lithium atom, glycols having 2 or more ether bonds are preferred.

More specifically, diethyl ether, diisopropyl ether, dibutyl ether, tetrahydrofuran, dimethoxyethane, cyclopentyl methyl ether, tert-butyl methyl ether, anisole, dimethoxyethane (DME), diethylene glycol dimethyl ether, ethylene glycol diethyl ether, diethylene glycol diethyl ether, and triethylene glycol dimethyl ether are preferred, and dimethoxyethane (DME) is more preferred.

As the other solvent than the amine compound, for example, a compound containing a group that contains a hetero atom such as an oxygen atom or a halogen atom, e.g., a chlorine atom has a high affinity to a lithium atom, and this is the other complexing agent than the above-mentioned amine compound. A compound having a group that contains a nitrogen atom as a hetero atom, except an amino group, for example, having a nitro group or an amide group, can also have the same effect. However, in the production method of the present embodiment, when the other complexing agent than the amine compound is used singly, this functions as a complexing agent, but when this is used as combined with an amine compound, the amine compound dominantly functions as the already-mentioned complexing agent, and therefore in this case, the other compound than the amine compound could not substantially function as a complexing agent but can function as a solvent as will be mentioned hereinunder.

A part of these solvents, for example, an ether solvent having a hetero atom can also be used as a solvent to be mentioned hereinunder. As described above, in the case where an amine compound is used as a complexing agent, the amine compound can dominantly function as the previously-mentioned complexing agent, and therefore the other solvent than the amine compound could not substantially function as a complexing agent but can function as a solvent.

The ether solvent described here as the other complexing agent can function as a solvent in the case where an amine compound is used as a complexing gent, but in the case where an amine compound is not used, this can function as a complexing agent. Consequently, the ether solvent is exemplified here also as the other solvent.

In the case where a solvent is used, the amount of the polar solvent relative to the total amount of the complexing agent and the solvent is preferably 10% by mass or more, more preferably 15% by mass or more, even more preferably 20% by mass or more, and the upper limit is preferably 65% by mass or less, more preferably 60% by mass or less, even more preferably 55% by mass or less.

(Production Method for Sulfide)

The sulfide can be produced by mixing the above-mentioned raw materials for sulfide. Mixing can be carried out in the same manner as that for the above-mentioned mixing method.

(Production Method for Complex (1))

The complex (1) can be produced by mixing the above-mentioned sulfide and the complexing agent (1). Mixing can be carried out in the same manner as that for the above-mentioned mixing method.

<Complex (2)>

The complex (2) in the present embodiment needs to contain a lithium atom and a halogen atom as constituent elements, and preferably further contains the complexing agent (2) to be mentioned hereinunder as a constituent element.

One alone of these constituent elements may be used, or two or more kinds thereof may be used as combined.

In the case where two or more kinds are used as combined, a halogenated complex may be produced from plural halides and complexing agents (2), but more preferably, a halogenated complex (A) is prepared from one kind of a halide (A) and a complexing agent (2), and a halogenated complex (B) is prepared using a different halide (B), and these are mixed to prepare a halogenated complex.

The content of the complexing agent (2) in the complex (2) is, from the viewpoint of obtaining a sulfide solid electrolyte having a high ionic conductivity, preferably 20% by mass or more on the total amount of the complex (2), more preferably 30% by mass or more, even more preferably 40% by mass or more, and is, from the viewpoint of crystal formation, preferably 90% by mass or less, more preferably 85% by mass or less, even more preferably 80% by mass or less.

(Halide)

The halide contains a lithium atom and a halogen atom, and, from the viewpoint of obtaining a sulfide solid electrolyte having a high ionic conductivity, the raw material for the halide is preferably a lithium halide such as lithium chloride (LiCl), lithium bromide (LiBr) or lithium iodide (LiI).

In the case where two or more kinds of the complex (2) are used as combined, a combination of lithium chloride and lithium bromide, or a combination of lithium bromide and lithium iodide is preferred, and a combination of lithium bromide and lithium iodide is more preferred.

In the case where a lithium bromide complex and a lithium iodide complex are used as combined, from the viewpoint of improving ionic conductivity, the proportion of lithium bromide to the total of lithium bromide and lithium iodide except the complex in the complex is preferably 1 to 99 mol %, more preferably 20 to 90 mol %, even more preferably 40 to 80 mol %, further more preferably 50 to 70 mol %.

As needed, lithium compounds, such as lithium oxide, lithium hydroxide, and lithium carbonate; alkali metal sulfides, such as sodium sulfide, potassium sulfide, rubidium sulfide, and cesium sulfide; metal sulfides, such as silicon sulfide, germanium sulfide, boron sulfide, gallium sulfide, tin sulfide (SnS and $SnS_2$), aluminum sulfide, and zinc sulfide; phosphate compounds, such as sodium phosphate and lithium phosphate; alkali metal halide compounds of an alkali metal other than lithium, such as sodium halides, e.g., sodium iodide, sodium fluoride, sodium chloride, and sodium bromide; metal halides, such as an aluminum halide, a silicon halide, a germanium halide, an arsenic halide, a selenium halide, a tin halogen, an antimony halide, a tellurium halide, and a bismuth halide; and phosphorus oxyhalides, such as phosphorus oxychloride ($POCl_3$) and phosphorus oxybromide ($POBr_3$) are also usable. The same shall apply to the complex (2).

(Complexing Agent (2))

The same as that described for the complexing agent (1) applies to the complexing agent (2). The complexing agent (2) may be the same as or different form the complexing agent (1).

(Production Method for Halide)

The halide can be produced by mixing the raw material for the halide. Mixing can be carried out in the same manner as that for the mixing method mentioned above.

(Production Method for Halide Complex)

The halide complex can be produced by mixing the halide and the complexing agent (2). Mixing can be carried out in the same manner as that for the mixing method mentioned above.

<Complex (1) and Complex (2)>

The present embodiments need to mix the complex (1) and the complex (2). The amount of the complex (1) and the complex (2) to be used may be determined depending on the type of the complex (1) and the complex (2) and therefore could not be indiscriminately defined. In the case where an $Li_3PS_4$ complex formed of lithium sulfide and diphosphorus pentasulfide is used as the complex (1) and where a lithium bromide complex and a lithium iodide complex are used as the complex (2), the proportion of lithium bromide and lithium iodide to uncomplexed $Li_3PS_4$ is, from the viewpoint of improving ionic conductivity, preferably 30 to 70 mol %, more preferably 35 to 65 mol %, even more preferably 40 to 60 mol %.

(Solvent)

Preferably, a solvent is added in mixing a sulfide and the complexing agent (1), in mixing a halide and the complexing agent (2), and in mixing the complex (1) and the complex (2). When a solvent is used in mixing a sulfide and the complexing agent (1) and in mixing a halide and the complexing agent (2), formation of the complex (1) and the complex (2) is promoted. Further, when a solvent is used in mixing the complex (1) and the complex (2), formation of a precursor is promoted, and as a result, a lithium-containing complex (1) such as a $PS_4$ structure, and a lithium-containing complex (2) such as a lithium halide can be made to exist uniformly with ease. Accordingly, a precursor in which a halogen atom is more effectively dispersed and fixed can be obtained and, as a result, the effect of attaining a high ionic conductivity can be exhibited with ease.

As the solvent having such properties, a solvent having a solubility parameter of 10 or less is preferably exemplified. In this specification, the solubility parameter is described in various literatures, for example, "Handbook of Chemistry" (published in 2004, Revised 5th Edition, by Maruzen Publishing Co., Ltd.) and is a value $\delta$ ($(cal/cm^3)^{1/2}$) calculated according to the following numerical formula (1), which is also called a Hildebrand parameter, SP value.

$$\delta = \sqrt{(\Delta H - RT)/V} \tag{1}$$

In the numerical formula (1), $\Delta H$ is a molar heating value; R is a gas constant; T is a temperature; and V is molar volume.

By using the solvent having a solubility parameter of 10 or less, the solvent has such properties that as compared by the aforementioned complexing agent, it relatively hardly dissolves the halogen atom, the raw materials containing a halogen atom, such as a lithium halide, and further the halogen atom-containing component constituting the co-crystal contained in the precursor (for example, an aggregate in which lithium halide and the complexing agent are bound with each other); it is easy to fix the halogen atom within the precursor; the halogen atom is existent in a favorable state in the resulting precursor and further the sulfide solid electrolyte; and a sulfide solid electrolyte having a high ionic conductivity is readily obtained. That is, it is preferred that the solvent which is used in the present embodiment has such properties that it does not dissolve the precursor. From the same viewpoint, the solubility parameter of the solvent is preferably 9.5 or less, more preferably 9.0 or less, and still more preferably 8.5 or less.

More specifically, as the solvent which is used in the production method for a sulfide solid electrolyte, it is possible to broadly adopt a solvent which has conventionally been used in the production of a sulfide solid electrolyte. Examples thereof include hydrocarbon solvents, such as an aliphatic hydrocarbon solvent, an alicyclic hydrocarbon solvent, and an aromatic hydrocarbon solvent; and carbon atom-containing solvents, such as an alcohol solvent, an ester solvent, an aldehyde solvent, a ketone solvent, an ether solvent, and a solvent containing a carbon atom and a hetero atom. Of these, preferably, a solvent having a solubility parameter falling within the aforementioned range may be appropriately selected and used. At least one solvent selected from an aliphatic hydrocarbon solvent, an alicyclic hydrocarbon solvent, an aromatic hydrocarbon solvent and an ether solvent is preferred.

More specifically, examples of the solvent include an aliphatic hydrocarbon solvent, such as hexane (7.3), pentane (7.0), 2-ethylhexane, heptane (7.4), octane (7.5), decane, undecane, dodecane, and tridecane; an alicyclic hydrocarbon solvent, such as cyclohexane (8.2) and methylcyclohexane; an aromatic hydrocarbon solvent, such as benzene, toluene (8.8), xylene (8.8), mesitylene, ethylbenzene (8.8), tert-butylbenzene, trifluoromethylbenzene, nitrobenzene, chlorobenzene (9.5), chlorotoluene (8.8), and bromobenzene; an alcohol solvent, such as ethanol (12.7) and butanol (11.4); an ester solvent, such as ethyl acetate (9.1) and butyl acetate (8.5); an aldehyde solvent, such as formaldehyde, acetaldehyde (10.3), and dimethylformamide (12.1); a ketone solvent, such as acetone (9.9) and methyl ethyl ketone; an ether solvent, such as diethyl ether (7.4), diisopropyl ether (6.9), dibutyl ether, tetrahydrofuran (9.1), dimethoxyethane (7.3), cyclopentylmethyl ether (8.4), tert-butylmethyl ether, and anisole; and a solvent containing a carbon atom and a hetero atom, such as acetonitrile (11.9), dimethyl sulfoxide, and carbon disulfide. The numerical values within the parentheses in the aforementioned exemplifications are an SP value.

In these solvents, an aliphatic hydrocarbon solvent, an alicyclic hydrocarbon solvent, an aromatic hydrocarbon solvent, and an ether solvent are preferred; from the viewpoint of obtaining a higher ionic conductivity more stably, heptane, cyclohexane, toluene, ethylbenzene, diethyl ether, diisopropyl ether, dibutyl ether, dimethoxyethane, cyclopentylmethyl ether, tert-butylmethyl ether, and anisole are more preferred; diethyl ether, diisopropyl ether, and dibutyl ether are still more preferred; diisopropyl ether and dibutyl ether are yet still more preferred; and dibutyl ether is especially preferred. The solvent which is used in the present embodiment is preferably the organic solvent as exemplified above and is an organic solvent different from the aforementioned complexing agent. In the present embodiment, these solvents may be used alone or in combination of plural kinds thereof.

In the case where a solvent is used, preferably, the solvent is used in an amount of 5 to 50 mL relative to 1 g of the total mass of the complex (1) and the complex (2), more preferably 10 to 30 mL.

<Precursor>

The precursor is produced, as described above, by mixing the complex (1) containing a sulfide that includes a sulfur atom and a phosphorus atom as a constituent element, and the complex (2) containing a halide that includes a lithium atom and a halogen atom as a constituent element in the manner as mentioned above, and contains the complexing agent, a lithium atom, a sulfur atom, a phosphorus atom and a halogen atom as constituent elements.

Preferably, the precursor is prepared, because, in the resultant sulfide solid electrolyte, a halogen atom can be more effectively dispersed and the solid electrolyte can be homogeneous and can have a high ionic conductivity.

Here, the complexing agent contained in the precursor is derived from the complexing agent (1) and the complexing agent (2).

Figure 8:
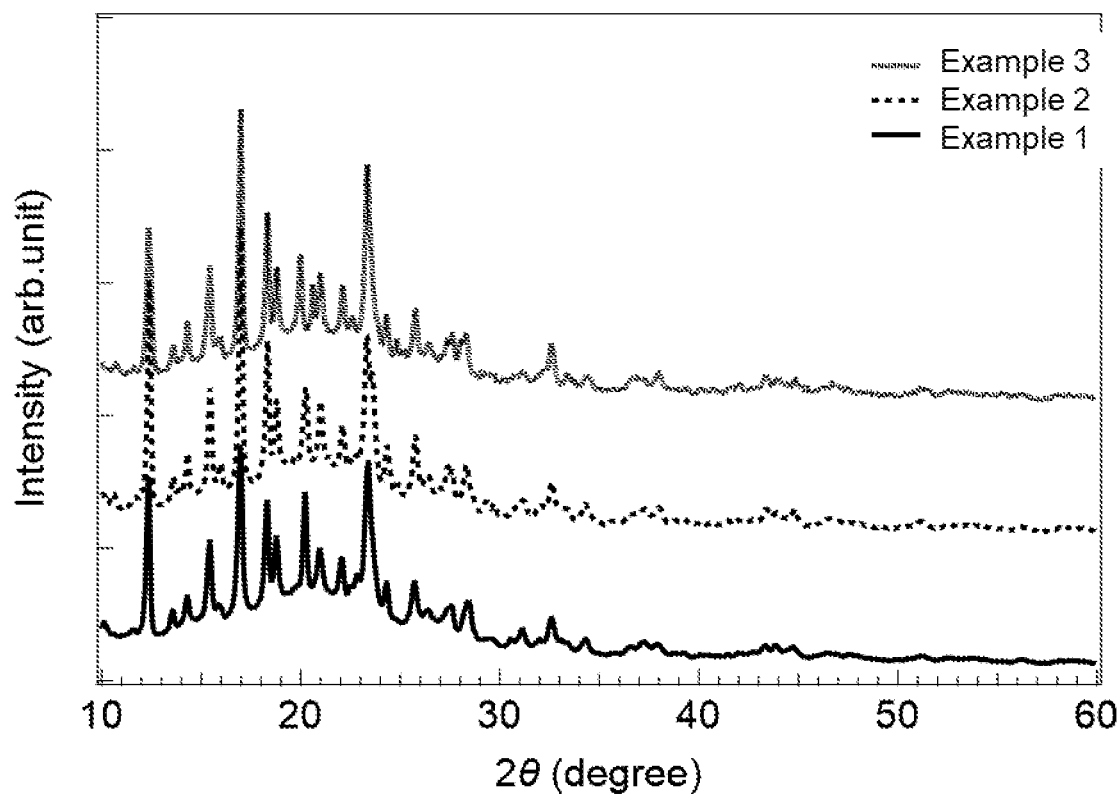
FIG. 8 This shows X-ray diffraction spectra of precursors (1) to (3) obtained in Examples 1 to 3.
Figure 9:
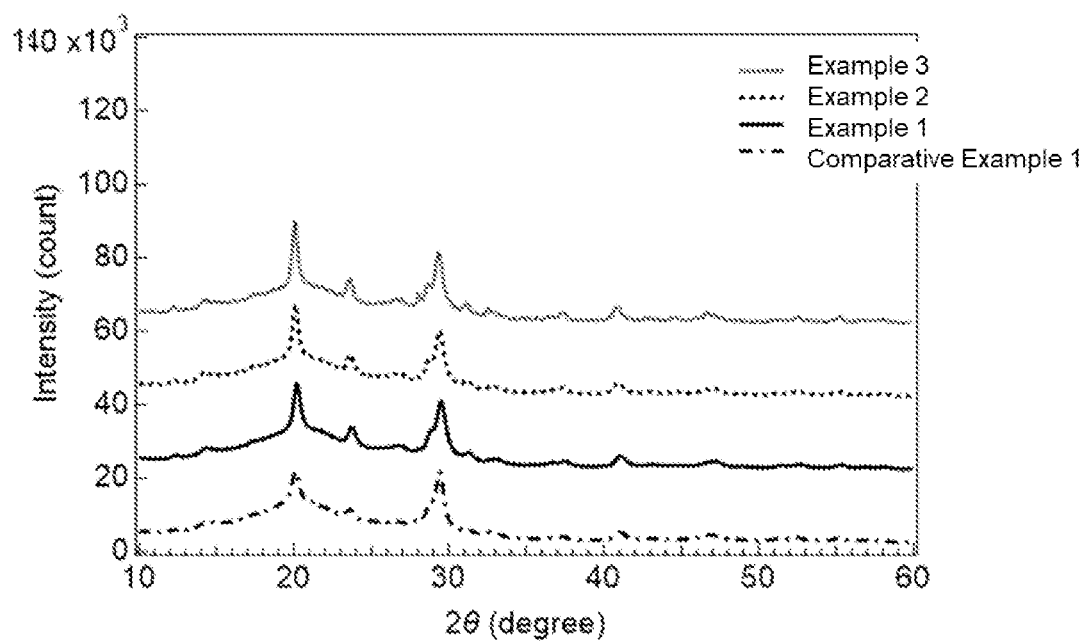
FIG. 9 This shows X-ray diffraction spectra (XRD patterns) of sulfide solid electrolytes obtained in Examples 1 to 3 and Comparative Example 1.

The precursor is characterized by having a structure different from that of the sulfide solid electrolyte. This is specifically confirmed in Examples. FIG. 9 shows X-ray diffraction patterns of sulfide solid electrolytes obtained in Examples, and it is known that these differ from the diffraction patterns of precursors (FIG. 8).

Preferably, the precursor is a co-crystal.

The co-crystal is formed of the complexing agent, a lithium atom, a sulfur atom, a phosphorus atom and a halogen atom, and typically, it is presumed that the co-crystal forms a complex structure of a lithium atom with the other atoms bonding to each other via and/or directly not via the complexing agent.

In the production method of a solid electrolyte of the present embodiment, what the co-crystal containing the halogen atom is formed is preferred from the standpoint of enhancing the ionic conductivity. By using the complexing agent, the lithium-containing structure, such as a $PS_4$ structure, and the lithium-containing raw materials, such as a lithium halide, are bound (coordinated) with each other via the complexing agent, the co-crystal in which the halogen atom is more likely dispersed and fixed is readily obtained, and the ionic conductivity is enhanced.

Here, the matter that the precursor forms a co-crystal can be confirmed by, for example, gas chromatography analysis. Specifically, a powder of the precursor is dissolved in methanol, and the resultant methanol solution is analyzed by gas chromatography to quantitatively determine the amount of the complexing agent contained in the co-crystal.

The matter that the halogen atom in the precursor constitutes the co-crystal can be confirmed from the fact that even when the solid-liquid separation of the precursor inclusion is performed, the predetermined amount of the halogen atom is contained in the precursor. This is because the halogen atom which does not constitute the co-crystal is easily eluted as compared with the halogen atom constituting the co-crystal and discharged into the liquid of solid-liquid separation. In addition, the foregoing matter can also be confirmed from the fact that by performing composition analysis through ICP analysis (inductively coupled plasma atomic emission spectrophotometry) of the precursor or sulfide solid electrolyte, a proportion of the halogen atom in the precursor or sulfide solid electrolyte is not remarkably lowered as compared with a proportion of the halogen atom fed from the raw materials.

The amount of the halogen atom remaining in the precursor is preferably 30% by mass or more, more preferably 35% by mass or more, and still more preferably 40% by mass or more relative to the charged composition. An upper limit of the halogen atom remaining in the precursor is 100% by mass.

The content of the complexing agent (complexing agent (1) and complexing agent (2)) in the precursor is, from the viewpoint of obtaining a solid electrolyte having a high ionic conductivity, preferably 30% by mass or more based on the total amount of the precursor, more preferably 35% by mass or more, even more preferably 40% by mass or more, and is, from the viewpoint of crystal formation, preferably 90% by mass or less, more preferably 80% by mass or less, even more preferably 70% by mass or less.

(Pulverization)

Preferably, the production method for a sulfide solid electrolyte of the present embodiment further includes pulverizing the sulfide, the halide, the precursor and/or the sulfide solid electrolyte. By pulverizing the sulfide, the halide, the precursor and/or the sulfide solid electrolyte, a sulfide solid electrolyte having a small particle size can be obtained while suppressing reduction in the ionic conductivity of the electrolyte.

The pulverizer for use for pulverization in the present embodiment is not particularly restricted so long as it is able to pulverize the particles, and for example, a medium type pulverizer using a pulverization medium can be used. Among medium type pulverizers, taking into account the fact that the precursor is in a liquid state or slurry state mainly accompanied by liquids, such as the complexing agent and the solvent, a wet-type pulverizer capable of coping with wet pulverization is preferred.

Representative examples of the wet-type pulverizer include a wet-type bead mill, a wet-type ball mill, and a wet-type vibration mill, and a wet-type bead mill using beads as a pulverization medium is preferred from the standpoint that it is able to freely adjust the condition of a pulverization operation and is easy to cope with materials having a smaller particle diameter. In addition, a dry-type pulverizer, such as a dry-type medium type pulverizer, e.g., a dry-type bead mill, a dry-type ball mill, and a dry-type vibration mill, and a dry-type non-medium pulverizer, e.g., a jet mill, can also be used.

In the case where the precursor to be pulverized with a pulverizer is a slurry, a flow type pulverizer capable of being optionally subjected to circulation driving is preferred. More specifically, it is preferred to use a pulverizer of a mode of circulating the precursor inclusion liquid or precursor-containing slurry between a pulverizer (pulverization mixer) of pulverizing the slurry and a temperature-holding tank (reactor) as disclosed in JP 2010-140893 A.

The size of the bead which is used for the pulverizer may be appropriately selected according to the desired particle diameter and treatment amount and the like, and for example, it may be about 0.05 mmφ or more and 5.0 mmφ or less, and it is preferably 0.1 mmφ or more and 3.0 mmφ or less, and more preferably 0.3 mmφ or more and 2.5 mmφ or less in terms of a diameter of the bead.

As the pulverizer which is used for pulverization of the sulfide, the halide, the precursor and/or the sulfide solid electrolyte, a machine capable of pulverizing an object using ultrasonic waves, for example, a machine called an ultrasonic pulverizer, an ultrasonic homogenizer, a probe ultrasonic pulverizer, or the like, can be used.

In this case, various conditions, such as a frequency of ultrasonic waves, may be appropriately selected according to the desired average particle diameter of the precursor, and the like. The frequency may be, for example, about 1 kHz or more and 100 kHz or less, and from the viewpoint of more efficiently pulverizing the precursor, it is preferably 3 kHz or more and 50 kHz or less, more preferably 5 kHz or more and 40 kHz or less, and still more preferably 10 kHz or more and 30 kHz or less.

An output which the ultrasonic pulverizer has may be typically about 500 to 16,000 W, and it is preferably 600 to 10,000 W, more preferably 750 to 5,000 W, and still more preferably 900 to 1,500 W.

Although an average particle diameter ($D_{50}$) of the precursor and/or the sulfide solid electrolyte obtained through pulverization is appropriately determined according to the desire, it is typically 0.01 µm or more and 50 µm or less, preferably 0.03 µm or more and 5 µm or less, more preferably 0.05 µm or more and 3 µm or less. By taking such an average particle diameter, it becomes possible to cope with the desire of the sulfide solid electrolyte having a small particle diameter as 1 µm or less in terms of an average particle diameter.

The time for pulverization is not particularly restricted so long as it is a time such that the sulfide, the halide, the precursor and/or the sulfide solid electrolyte can have a desired average particle diameter, and it is typically 0.1 hours or more and 100 hours or less. From the viewpoint of efficiently regulating the particle diameter to the desired size, the time for pulverization is preferably 0.3 hours or more and 72 hours or less, more preferably 0.5 hours or more and 48 hours or less, and still more preferably 1 hour or more and 24 hours or less.

The pulverization may be performed after drying the sulfide, the halide, the precursor and/or the sulfide solid electrolyte to make the precursor powdery.

In this case, among the aforementioned pulverizers as exemplified as the pulverizer which may be used in the present production method, any one of the dry-type pulverizers is preferably used.

(Drying)

The production method for a sulfide solid electrolyte of the present embodiment may include drying the complex (1), the complex (2), the precursor and/or the sulfide solid electrolyte. According to this, the complexing agent and the solvent can be removed, and powders of the complex (1), the complex (2), the precursor and/or the sulfide solid electrolyte are obtained. By performing drying in advance, it becomes possible to efficiently perform heating. The drying and the subsequent heating may be performed in the same process.

The complex (1), the complex (2), the precursor and/or the sulfide solid electrolyte can be dried at a temperature according to the kind of the remaining complexing agent (complexing agent not incorporated into the substances to be dried). For example, the drying can be performed at a temperature not lower than the boiling point of the solvent and the complexing agent. The drying can be performed through drying under reduced pressure (vacuum drying) by using a vacuum pump or at typically 5 to 100° C., preferably 10 to 85° C., more preferably 15 to 70° C., and still more preferably around room temperature (23° C.) (for example, (room temperature)±about 5° C.), to volatilize the complexing agent.

The drying may be performed by subjecting the complex (1), the complex (2), the precursor and/or the sulfide solid electrolyte to solid-liquid separation by means of filtration with a glass filter or the like, or decantation, or solid-liquid separation with a centrifuge or the like. In the present embodiment, after performing the solid-liquid separation, the drying may be performed under the aforementioned temperature condition.

Specifically, for the solid-liquid separation, decantation in which the complex (1), the complex (2), the precursor and/or the sulfide solid electrolyte is transferred into a container, and after the precursor is precipitated, the complexing agent and solvent as a supernatant are removed, or filtration with a glass filter having a pore size of, for example, about 10 to 200 µm, and preferably 20 to 150 µm, is easy.

(Heating)

Also preferably, the production method of a sulfide solid electrolyte of the present embodiment further includes heating after mixing the complex (1) and the complex (2). Namely, it is preferred to obtain an amorphous sulfide solid electrolyte by heating the precursor, and to obtain a crystalline sulfide solid electrolyte by heating the precursor or the amorphous sulfide solid electrolyte.

By heating the precursor, the complexing agent and the solvent are removed from the precursor, and an amorphous sulfide solid electrolyte or a crystalline sulfide solid electrolyte containing a lithium atom, a sulfur atom, a phosphorus atom, and a halogen atom is given. The precursor to be heated by the present heating may be a precursor pulverized product which has been pulverized through the aforementioned pulverization.

Here, the fact that the complexing agent in the precursor is removed is supported by the facts that in addition to the fact that it is evident the complexing agent constitutes the co-crystal of the precursor from the results of the X-ray diffraction pattern, the gas chromatography analysis, the sulfide solid electrolyte obtained by removing the complexing agent through heating of the precursor is identical in the X-ray diffraction pattern with the sulfide solid electrolyte obtained by the conventional method without using the complexing agent.

In the production method of the present embodiment, the sulfide solid electrolyte is obtained by heating the precursor to remove the complexing agent in the precursor, and it is preferred that the content of the complexing agent in the sulfide solid electrolyte is low as far as possible. However, the complexing agent may be contained to an extent that the performance of the sulfide solid electrolyte is not impaired. The content of the complexing agent in the sulfide solid electrolyte may be typically 10% by mass or less, and it is preferably 5% by mass or less, more preferably 3% by mass or less, and still more preferably 1% by mass or less.

In the production method of the present embodiment, in order to obtain the crystalline sulfide solid electrolyte, it may be obtained by heating the precursor, or it may be obtained by heating the precursor to obtain the amorphous sulfide solid electrolyte and then heating the amorphous sulfide solid electrolyte. That is, in the production method of the present embodiment, the amorphous sulfide solid electrolyte can also be produced.

Conventionally, in order to obtain a crystalline sulfide solid electrolyte having a high ionic conductivity, for example, a sulfide solid electrolyte having a thio-LISICON Region II-type crystal structure as mentioned later, it was required that an amorphous sulfide solid electrolyte is prepared through mechanical pulverization treatment, such as mechanical milling, or other melt quenching treatment or the like, and then, the amorphous sulfide solid electrolyte is heated. But, it may be said that the production method of the present embodiment is superior to the conventional production method by mechanical milling treatment or the like from the standpoint that a crystalline sulfide solid electrolyte having a thio-LISICON Region II-type crystal structure is obtained even by a method of not performing mechanical pulverization treatment, other melt quenching treatment, or the like.

In the production method of a sulfide solid electrolyte of the present embodiment, whether or not the amorphous sulfide solid electrolyte is obtained, whether or not the crystalline sulfide solid electrolyte is obtained, whether or not after obtaining the amorphous sulfide solid electrolyte, the crystalline sulfide solid electrolyte is obtained, or whether or not the crystalline sulfide solid electrolyte is obtained directly from the precursor is appropriately selected according to the desire, and is able to be adjusted by the heating temperature, the heating time, or the like.

For example, in the case of obtaining the amorphous sulfide solid electrolyte, the heating temperature of the precursor may be determined according to the structure of the crystalline sulfide solid electrolyte which is obtained by heating the amorphous sulfide solid electrolyte (or the precursor). Specifically, the heating temperature may be determined by subjecting the amorphous sulfide solid electrolyte (or the precursor) to differential thermal analysis (DTA) with a differential thermal analysis device (DTA device) under a temperature rise condition of 10° C./min and adjusting the temperature to a range of preferably 5° C. or lower, more preferably 10° C. or lower, and still more preferably 20° C. or lower starting from a peak top temperature of the exothermic peak detected on the lowermost temperature side. Although a lower limit thereof is not particularly restricted, it may be set to a temperature of about [(peak top temperature of the exothermic peak detected on the lowermost temperature side)−40° C.] or higher. By regulating the heating temperature to such a temperature range, the amorphous sulfide solid electrolyte is obtained more efficiently and surely.

Although the heating temperature for obtaining the amorphous sulfide solid electrolyte cannot be unequivocally prescribed because it varies with the structure of the resulting crystalline sulfide solid electrolyte, in general, it is preferably 250° C. or lower, more preferably 220° C. or lower, and still more preferably 220° C. or lower. Although a lower limit of the heating temperature is not particularly limited, it is preferably 90° C. or higher, more preferably 100° C. or higher, and still more preferably 110° C. or higher.

Preferably, the heating is carried out under reduced pressure, and from the viewpoint of apparatus, the pressure is 0.1 Pa or more, more preferably 1.0 Pa or more, even more preferably 5.0 Pa or more, and from the viewpoint of obtaining a solid electrolyte having a high ionic conductivity, the pressure is preferably 100.0 Pa or less, more preferably 50.0 Pa or less, even more preferably 20.0 Pa or less.

In the case of obtaining the crystalline sulfide solid electrolyte by heating the amorphous sulfide solid electrolyte or directly from the precursor, the heating temperature may be determined according to the structure of the crystalline sulfide solid electrolyte, and it is preferably higher than the aforementioned heating temperature for obtaining the amorphous sulfide solid electrolyte.

Specifically, the heating temperature may be determined by subjecting the amorphous sulfide solid electrolyte (or the precursor) to differential thermal analysis (DTA) with a differential thermal analysis device (DTA device) under a temperature rise condition of 10° C./min and adjusting the temperature to a range of preferably 5° C. or higher, more preferably 10° C. or higher, and still more preferably 20° C. or higher starting from a peak top temperature of the exothermic peak detected on the lowermost temperature side. Although an upper limit thereof is not particularly restricted, it may be set to a temperature of about [(peak top temperature of the exothermic peak detected on the lowermost temperature side)+40° C.] or lower. By regulating the heating temperature to such a temperature range, the crystalline sulfide solid electrolyte is obtained more efficiently and surely. Although the heating temperature for obtaining the crystalline sulfide solid electrolyte cannot be unequivocally prescribed because it varies with the structure of the resulting crystalline sulfide solid electrolyte, in general, it is preferably 130° C. or higher, more preferably 135° C. or higher, and still more preferably 140° C. or lower. Although an upper limit of the heating temperature is not particularly limited, it is preferably 300° C. or lower, more preferably 280° C. or lower, and still more preferably 250° C. or lower.

Although the heating time is not particularly limited so long as it is a time for which the desired amorphous sulfide solid electrolyte or crystalline sulfide solid electrolyte is obtained, for example, it is preferably 1 minute or more, more preferably 10 minutes or more, still more preferably 30 minutes or more, and yet still more preferably 1 hour or more. In addition, though an upper limit of the heating temperature is not particularly restricted, it is preferably 24 hours or less, more preferably 10 hours or less, still more preferably 5 hours or less, and yet still more preferably 3 hours or less.

It is preferred that the heating is performed in an inert gas atmosphere (for example, a nitrogen atmosphere and an argon atmosphere) or in a reduced pressure atmosphere (especially, in vacuum). This is because deterioration (for example, oxidation) of the crystalline sulfide solid electrolyte can be prevented from occurring. Although a method for heating is not particularly limited, for example, a method of using a hot plate, a vacuum heating device, an argon gas atmosphere furnace, or a firing furnace can be adopted. In addition, industrially, a lateral dryer or a lateral vibration fluid dryer provided with a heating means and a feed mechanism, or the like may be selected according to the heating treatment amount.

(Amorphous Sulfide Solid Electrolyte)

The amorphous sulfide solid electrolyte which is obtained by the production method of a sulfide solid electrolyte of the present embodiment contains the lithium atom, the sulfur atom, the phosphorus atom, and the halogen atom. As representative examples thereof, there are preferably exemplified sulfide solid electrolytes constituted of lithium sulfide, phosphorus sulfide, and a lithium halide, such as $Li_2S$—$P)_2S_5$—LiI, $Li_2S$—$P)_2S_5$—LiCl, $Li_2S$—$P)_2S_5$—LiBr, and $Li_2S$—$P_2S_5$—LiI—LiBr; and sulfide solid electrolytes further containing other atom, such as an oxygen atom and a silicon atom, for example, $Li_2S$—$P)_2S_5$—$Li_2O$—LiI and $Li_2S$—$SiS_2$—$P)_2S_5$—LiI. From the viewpoint of obtaining a higher ionic conductivity, sulfide solid electrolytes constituted of lithium sulfide, phosphorus sulfide, and a lithium halide, such as $Li_2S$—$P)_2S_5$—LiI, $Li_2S$—$P)_2S_5$—LiCl, $Li_2S$—$P)_2S_5$—LiBr, and $Li_2S$—$P_2S_5$—LiI—LiBr, are preferred.

The kinds of the atoms constituting the amorphous sulfide solid electrolyte can be confirmed by, for example, an inductively coupled plasma optical emission spectrometer (ICP).

In the case where the amorphous sulfide solid electrolyte obtained in the production method of a sulfide solid electrolyte of the present embodiment is one having at least $Li_2S$—$P_2S_5$, from the viewpoint of obtaining a higher ionic conductivity, a molar ratio of $Li_2S$ to $P_2S_5$ is preferably (65 to 85)/(15 to 35), more preferably (70 to 80)/(20 to 30), and still more preferably (72 to 78)/(22 to 28).

In the case where the amorphous sulfide solid electrolyte obtained in the production method of a sulfide solid electrolyte of the present embodiment is $Li_2S$—$P_2S_5$—LiI—LiBr, the total content of lithium sulfide and phosphorus pentasulfide is preferably 60 to 95 mol %, more preferably 65 to 90 mol %, and still more preferably 70 to 85 mol %. In addition, a proportion of lithium bromide relative to the total of lithium bromide and lithium iodide is preferably 1 to 99 mol %, more preferably 20 to 90 mol %, still more preferably 40 to 80 mol %, and especially preferably 50 to 70 mol %.

In the amorphous sulfide solid electrolyte obtained in the production method of a sulfide solid electrolyte of the present embodiment, a blending ratio (molar ratio) of lithium atom to sulfur atom to phosphorous atom to halogen atom is preferably (1.0 to 1.8)/(1.0 to 2.0)/(0.1 to 0.8)/(0.01 to 0.6), more preferably (1.1 to 1.7)/(1.2 to 1.8)/(0.2 to 0.6)/(0.05 to 0.5), and still more preferably (1.2 to 1.6)/(1.3 to 1.7)/(0.25 to 0.5)/(0.08 to 0.4). In addition, in the case of using a combination of bromine and iodine as the halogen atom, a blending ratio (molar ratio) of lithium atom to sulfur atom to phosphorus atom to bromine to iodine is preferably (1.0 to 1.8)/(1.0 to 2.0)/(0.1 to 0.8)/(0.01 to 3.0)/(0.01 to 0.3), more preferably (1.1 to 1.7)/(1.2 to 1.8)/(0.2 to 0.6)/(0.02 to 0.25)/(0.02 to 0.25), still more preferably (1.2 to 1.6)/(1.3 to 1.7)/(0.25 to 0.5)/(0.03 to 0.2)/(0.03 to 0.2), and yet still more preferably (1.35 to 1.45)/(1.4 to 1.7)/(0.3 to 0.45)/(0.04 to 0.18)/(0.04 to 0.18). By allowing the blending ratio (molar ratio) of lithium atom to sulfur atom to phosphorus atom to halogen atom to fall within the aforementioned range, it becomes easy to provide a sulfide solid electrolyte having a thio-LISICON Region II-type crystal structure and having a higher ionic conductivity.

Although the shape of the amorphous sulfide solid electrolyte is not particularly restricted, examples thereof include a granular shape. The average particle diameter ($D_{50}$) of the granular amorphous sulfide solid electrolyte is, for example, within a range of 0.01 to 500 μm, and preferably 0.1 to 200 μm.

(Crystalline Sulfide Solid Electrolyte)

The crystalline sulfide solid electrolyte obtained by the production method of a sulfide solid electrolyte of the present embodiment may be a so-called glass ceramics which is obtained by heating the amorphous sulfide solid electrolyte to a crystallization temperature or higher. Examples of a crystal structure thereof include an $Li_3PS_4$ crystal structure, an $Li_4P_2S_6$ crystal structure, an $Li_7PS_6$ crystal structure, an $Li_7P_3S_{11}$ crystal structure, and a crystal structure having peaks at around of $2\theta=20.2°$ and $23.6°$ (see, for example, JP 2013-16423 A).

In addition, examples thereof include an $Li_{4-x}Ge_{1-x}P_xS_4$ thio-LISICON Region II-type crystal structure (see Kanno, et al., Journal of The Electrochemical Society, 148 (7) A742-746 (2001)) and a crystal structure similar to the $Li_{4-x}Ge_{1-x}P_xS_4$ thio-LISICON Region II-type crystal structure (see Solid State Ionics, 177 (2006), 2721-2725). Among them, the thio-LISICON Region II-type crystal structure is preferred as the crystal structure of the crystalline sulfide solid electrolyte obtained by the production method of a sulfide solid electrolyte of the present embodiment from the standpoint that a higher ionic conductivity is obtained.

Here, the "thio-LISICON Region II-type crystal structure" expresses any one of a $Li_{4-x}Ge_{1-x}P_xS_4$ thio-LISICON Region II-type crystal structure and a crystal structure similar to the $Li_{4-x}Ge_{1-x}P_xS_4$ thio-LISICON Region II-type crystal structure. In addition, though the crystalline sulfide solid electrolyte obtained by the production method of a sulfide solid electrolyte of the present embodiment may be one having the aforementioned thio-LISICON Region II-type crystal structure or may be one having the thio-LISICON Region II-type crystal structure as a main crystal, it is preferably one having the thio-LISICON Region II-type crystal structure as a main crystal. In this specification, the wording "having as a main crystal" means that a proportion of the crystal structure serving as an objective structure among the all crystal phases is 80% or more, and it is preferably 90% or more, and more preferably 95% or more. In addition, from the viewpoint of obtaining a higher ionic conductivity, the crystalline sulfide solid electrolyte obtained by the production method of a sulfide solid electrolyte of the present embodiment is preferably one not containing crystalline $Li_3PS_4$ (β-$Li_3PS_4$).

In the X-ray diffractometry using a CuKα ray, the $Li_3PS_4$ crystal structure gives diffraction peaks, for example, at around $2\theta=17.5°$, $18.3°$, $26.1°$, $27.3°$, and $30.0°$; the $Li_4P_2S_6$ crystal structure gives diffraction peaks, for example, at around $2\theta=16.9°$, $27.1°$, and $32.5°$; the $Li_7PS_6$ crystal structure gives diffraction peaks, for example, at around $2\theta=15.3°$, $25.2°$, $29.6°$, and $31.0°$; the $Li_7P_3S_{11}$ crystal structure gives diffraction peaks, for example, at around $2\theta=17.8°$, $18.5°$, $19.7°$, $21.8°$, $23.7°$, $25.9°$, $29.6°$, and $30.0°$; the $Li_{4-x}Ge_{1-x}P_xS_4$ thio-LISICON Region II-type crystal structure gives diffraction peaks, for example, at around $2\theta=20.1°$, $23.9°$, and $29.5°$; and the crystal structure similar to the $Li_{4-x}Ge_{1-x}P_xS_4$ thio-LISICON Region II-type crystal structure gives diffraction peaks, for example, at around $2\theta=20.2°$ and $23.6°$. The position of these peaks may vary within a range of ±0.5°.

As mentioned above, in the case where the thio-LISICON Region II-type crystal structure is obtained in the present embodiment, the foregoing crystal structure is preferably one not containing crystalline $Li_3PS_4$ (β-$Li_3PS_4$).

Figure 10:
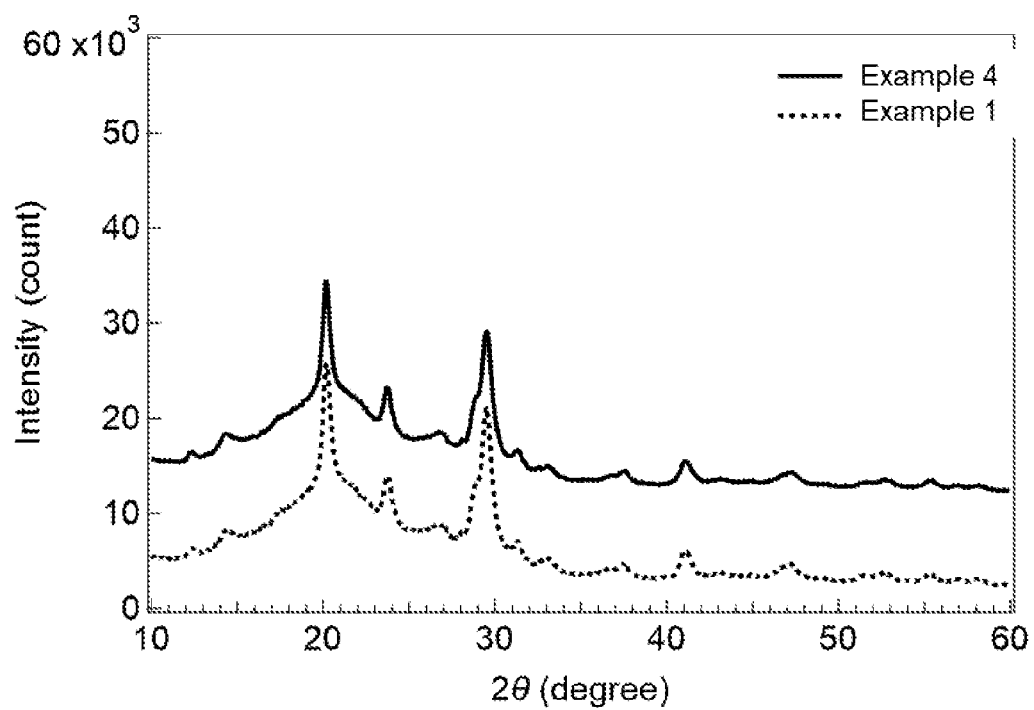
FIG. 10 This shows X-ray diffraction spectra (XRD patterns) of sulfide solid electrolytes obtained in Examples 1 and 4.
Figure 11:
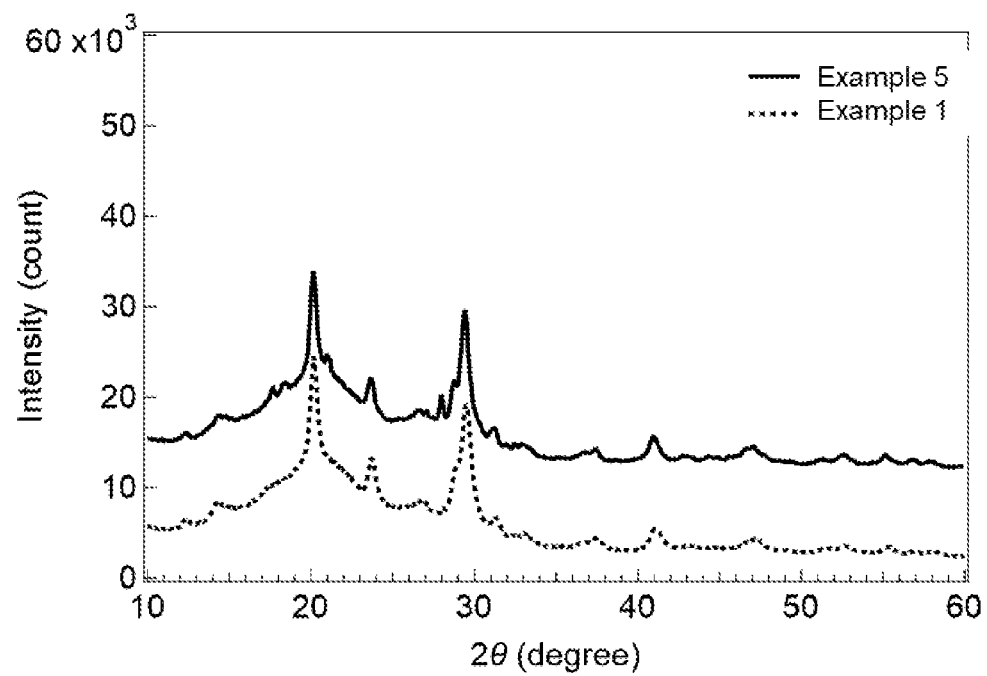
FIG. 11 This shows X-ray diffraction spectra (XRD patterns) of sulfide solid electrolytes obtained in Examples 1 and 5.

FIGS. 9 to 11 show X-ray diffractometry examples of the crystalline sulfide solid electrolytes obtained by the production method of the present embodiment. The sulfide solid electrolytes of the present embodiment do not have diffraction peaks at $2\theta=17.5°$ and $26.1°$ as given by a crystalline $Li_3PS_4$, or even in the case where these have diffraction patterns, extremely small peaks as compared with the diffraction peaks of the thio-LISICON Region II-type crystal structure are merely detected.

The crystal structure represented by a compositional formula $Li_{7-x}P_{1-y}Si_yS_6$ or $Li_{7+x}P_{1-y}Si_yS_6$ (x is −0.6 to 0.6, and y is 0.1 to 0.6), which has the aforementioned crystal structure of $Li_7PS_6$ and in which a part of P is substituted with Si, is a cubic crystal or a orthorhombic crystal, and is preferably a cubic crystal, and in X-ray diffractometry using a CuKα ray, the crystal structure gives peaks appearing mainly at $2\theta=15.5°$, $18.0°$, $25.0°$, $30.0°$, $31.4°$, $45.3°$, $47.0°$, and $52.0°$. The crystal structure represented by the aforementioned compositional formula $Li_{7-x-2y}PS_{6-x-y}Cl_x$ ($0.8 \leq x \leq 1.7$, and $0 < y \leq (-0.25x+0.5)$) is preferably a cubic crystal, and in the X-ray diffractometry using a CuKα ray, the crystal structure gives peaks appearing mainly at $2\theta=15.5°$, $18.0°$, $25.0°$, $30.0°$, $31.4°$, $45.3°$, $47.0°$, and $52.0°$. The crystal structure represented by the aforementioned compositional formula $Li_{7-x}PS_{6-x}Ha_x$ (Ha represents Cl or Br, and x is preferably 0.2 to 1.8) is preferably a cubic crystal, and in the X-ray diffractometry using a CuKα ray, the crystal structure gives peaks appearing mainly at 2θ=15.5°, 18.0°, 25.0°, 30.0°, 31.4°, 45.3°, 47.0°, and 52.0°.

These peak positions may vary within a range of ±0.5°.

Although the shape of the crystalline sulfide solid electrolyte is not particularly restricted, examples thereof include a granular shape. The average particle diameter ($D_{50}$) of the granular amorphous sulfide solid electrolyte is, for example, within a range of 0.01 to 500 μm, and preferably 0.1 to 200 μm.

(Positive Electrode Mixture and Negative Electrode Mixture)

For example, in the case of using the sulfide solid electrolyte for the positive electrode layer or the negative electrode layer, by dispersing a positive electrode active material or a negative electrode active material in a precursor-containing liquid or precursor-containing slurry, each of which is the precursor inclusion, mixing them, and drying, the precursor is attached onto the active material surface. Furthermore, similar to the aforementioned embodiment, by heating the precursor, it becomes an amorphous sulfide solid electrolyte or crystalline sulfide solid electrolyte. At this time, by heating together with the active material, the positive electrode mixture or negative electrode mixture having the sulfide solid electrolyte attached onto the active material surface is obtained.

As the positive electrode active material, any material can be used without particular restrictions so far as it may promote a battery chemical reaction accompanied by transfer of a lithium ion caused due to the lithium atom to be preferably adopted as an atom capable of realizing the ionic conductivity in the present embodiment in relation to the negative electrode active material. Examples of such a positive electrode active material in and from which a lithium ion can be inserted and released include an oxide positive electrode active material and a sulfide positive electrode active material.

Preferably, examples of the oxide positive electrode active material include lithium-containing transition metal complex oxides, such as LMO (lithium manganese oxide), LCO (lithium cobalt oxide), NMC (lithium nickel manganese cobalt oxide), NCA (lithium nickel cobalt aluminium oxide), LNCO (lithium nickel cobalt oxide), and an olivine type compound ($LiMeNPO_4$:Me=Fe, Co, Ni, or Mn).

Examples of the sulfide positive electrode active material include titanium sulfide ($TiS_2$), molybdenum sulfide ($MoS_2$), iron sulfide (FeS and $FeS_2$), copper sulfide (CuS), and nickel sulfide ($Ni_3S_2$).

Besides the aforementioned positive electrode active materials, niobium selenide ($NbSe_3$) and so on can also be used.

In the present embodiment, the positive electrode active material can be used alone or in combination of plural kinds thereof.

As the negative electrode active material, any material can be used without particular restrictions so long as it may promote a battery chemical reaction accompanied by transfer of a lithium ion caused preferably due to the lithium atom, such as an atom which is preferably adopted as an atom realizing the ionic conductivity in the present embodiment, and preferably a metal capable of forming an alloy together with the lithium atom, an oxide thereof, and an alloy of the foregoing metal and the lithium atom. As such a negative electrode active material in and from which a lithium ion can be inserted and released, any material which is known as the negative electrode material in the battery field can be adopted without restrictions.

Examples of such a negative active material include metallic lithium or a metal capable of forming an alloy together with metallic lithium, such as metallic lithium, metallic indium, metallic aluminum, metallic silicon, and metallic tin; an oxide of such a metal; and an alloy of such a metal and metallic lithium.

The electrode active material which is used in the present embodiment may also be one having a coating layer whose surface is coated.

Examples of the material which forms the coating layer include ionic conductors, such as nitrides or oxides of an atom realizing the ionic conductivity in the crystalline sulfide solid electrolyte to be used in the present embodiment, preferably a lithium atom, or complexes thereof. Specifically, examples thereof include lithium nitride ($Li_3N$); a conductor having a lisicon type crystal structure composed of, as a main structure, $Li_4GeO_4$, for example, $Li_{4-2x}Zn_xGeO_4$; a conductor having an $Li_3PO_4$ type skeleton structure, for example, a thiolisicon type crystal structure, such as $Li_{4-x}Ge_{1-x}P_xS_4$; a conductor having a perovskite type crystal structure, such as $La_{2/3-x}Li_{3x}TiO_3$; and a conductor having an NASICON type crystal structure, such as $LiTi_2(PO_4)_3$.

In addition, examples thereof include lithium titanium oxides, such as $Li_yTi_{3-y}O_4$ (0<y<3) and $Li_4Ti_5O_{12}$ (LTO); lithium metal oxides whose component of a metal belonging to the Group 5 of the periodic table, such as $LiNbO_3$ and $LiTaO_3$; and oxide conductors, such as $Li_2O$—$B_2O_3$—$P_2O_5$, $Li_2O$—$B_2O_3$—ZnO, and $Li_2O$—$Al_2O_3$—$SiO_2O_5$—$TiO_2$ materials.

The electrode active material having a coating layer is, for example, obtained by attaching a solution containing various atoms constituting a material for forming the coating layer onto the surface of the electrode active material and burning the electrode active material after attachment preferably at 200° C. or higher and 400° C. or lower.

Here, as the solution containing various atoms, a solution containing an alkoxide of a metal of every sort, such as lithium ethoxide, titanium isopropoxide, niobium isopropoxide, and tantalum isopropoxide, may be used. In this case, as the solvent, an alcohol solvent, such as ethanol and butanol; an aliphatic hydrocarbon solvent, such as hexane, heptane, and octane; an aromatic hydrocarbon solvent, such as benzene, toluene, and xylene; and so on may be used.

The aforementioned attachment may be performed through dipping, spray coating, or the like.

From the viewpoint of enhancing the production efficiency and the battery performance, a sintering temperature is preferably 200° C. or higher and 400° C. or lower as mentioned above, and more preferably 250° C. or higher and 390° C. or lower, and a heating (or sintering) time is typically about 1 minute to 10 hours, and preferably 10 minutes to 4 hours.

A coverage of the coating layer on a basis of a surface area of the electrode active material is preferably 90% or more, more preferably 95% or more, and still more preferably 100%, namely it is preferred that the entire surface is coated. In addition, a thickness of the coating layer is preferably 1 nm or more, and more preferably 2 nm or more, and an upper limit thereof is preferably 30 nm or less, and more preferably 25 nm or less.

The thickness of the coating layer can be measured through cross-sectional observation with a transmission electron microscope (TEM), and the coverage can be calculated from the thickness, the atomic analysis value, and the BET surface area of the coating layer.

The aforementioned battery preferably uses a collector in addition to the positive electrode layer, the electrolyte layer, and the negative electrode layer, and the collector can be any known one. For example, a layer formed by coating Au, Pt, Al, Ti, Cu, or the like capable of reacting with the aforementioned sulfide solid electrolyte, with Au or the like can be used.

EXAMPLES

Next, the present invention is described specifically with reference to Examples, but it should be construed that the present invention is by no means restricted by these Examples.

(1) Measurement Methods are Described (1-1) Volume-Based Average Particle Diameter (D50)

Measured with a laser diffraction/scattering-type particle size distribution measuring apparatus (LA-950V2 Model LA-950W2, by Horiba Ltd.).

A mixture prepared by mixing dewatered toluene (special grade chemical, by FUJIFILM Wako Chemicals Corporation) and tertiary butyl alcohol (special grade chemical, by FUJIFILM Wako Chemicals Corporation) in a ratio by weight of 93.8/6.2 was used as a dispersant. 50 mL of the dispersant was injected into the flow cell in the apparatus, and circulated therethrough, and the target sample to be analyzed was added and ultrasonically processed, and then the particle size distribution thereof was measured. The amount of the target sample to be added was so controlled on the instruction panel of the apparatus that the red light transmittance (R) corresponding to the particle concentration could fall 80 to 90% and the blue light transmittance (B) could fall 70 to 90%. For the computation parameters, the refractive index of the target sample was 2.16, and the refractive index of the dispersant was 1.49. In presetting the distribution mode, the number of iterations was fixed to be 15 for particle size computation.

(1-2) Measurement of Ion Conductivity

The sulfide solid electrolyte produced in Examples was filled in a pelletizing machine, and molded into pellets under pressure of 22 MPa. As an electrode, carbon was put on both surfaces of each pellet and again pressurized in the pelletizing machine to prepare measurement pellet samples (diameter, about mm; thickness, 0.1 to 0.2 cm). According to alternating-current impedance-metry, the pellets were analyzed to measure the ionic conductivity thereof. The conductivity value at 25° C. was taken here as the ion conductivity of the sample.

(1-3) X-ray Diffractometry (XRD)

The crystalline products obtained were analyzed through XRD measurement.

A powder of the precursor or the solid electrolyte produced in Examples was filled in a groove having a diameter of 20 mm and a depth of 0.2 mm, and leveled with a plate of glass to prepare a sample. The sample was analyzed using an XRD kapton film while kept away from contact with air.

Using a powder X-ray diffractometer D2 PHASER by Bruker Corporation, the samples were analyzed under the following condition.
Tube voltage: 30 kV
Tube current: 10 mA
X-ray wavelength: Cu-Kα ray (1.5418 Å)
Optical system: concentration method optical system
Slit configuration: solar slit 4°, scattering slit 1 mm, using Kβ filter (Ni plate)
Detector: semiconductor detector
Measurement range: 2θ=10 to 60 deg
Step width, scan speed: 0.05 deg, 0.05 deg/sec (2) Production Examples for Complex (1) ($Li_3PS_4$-TMEDA Complex) are Described (2-1) Production Example for Lithium Sulfide ($Li_2S$)

(2-1-1) Production Example for $Li_2S$

As a water-insoluble solvent, 303.8 kg of toluene (by Sumitomo Corporation) was dewatered (using a Carl Fischer moisture meter, the water content was confirmed to be not more than 100 ppm), and put into a 50-L (liter) stainless reactor tank in a nitrogen flowing atmosphere, and subsequently, 33.8 kg of anhydrous lithium hydroxide (by Honjo Chemical Corporation) was put thereinto, and stirred with a twin-stir impeller at 131 rpm, at 95° C. for 2 hours to give a slurry.

Further, while the stirring was continued, and while hydrogen sulfide (by Sumitomo Seika Chemicals Co., Ltd.) was injected into at a supply speed of 100 L/min, the slurry was heated up to 104° C. From the reactor tank, an azeotropic gas of water and toluene was continuously discharged out. The azeotropic gas was condensed with condenser outside the system and dewatered. During that period, the same amount of toluene as that evaporated away was continuously supplied to keep the reaction liquid level constant.

The amount of water in the condensed liquid gradually decreased, and in 24 hours after the start of hydrogen sulfide introduction, water distillation was no more recognized. During the reaction, toluene was kept dispersed in solid and stirred, and no water was separated from toluene.

After that, hydrogen sulfide was changed to nitrogen, and nitrogen was kept circulated in the system at 100 L/min for 1 hour.

The resultant solid was filtered out and dried to give a white powder, $Li_2S$. D50 of $Li_2S$ was 412 μm.

(2-1-2) Pulverization of $Li_2S$ $Li_2S$ obtained in (2-1-1) was pulverized with a pin mill having a volumetric feeder (100 UPZ, by Hosokawa Micron Corporation) in a nitrogen atmosphere. The feeding speed was 80 g/min, and the rotation speed of the disc was 18000 rpm.

After pulverized, D50 of $Li_2S$ was 7.7 μm.

(2-2) Production Example for Diphosphorus Pentasulfide ($P_2S_5$)

(2-2-1) Pulverization of $P_2S_5$ $P_2S_5$ (by Thermophos Corporation, D50=125 μm) was pulverized in the same manner as in (2-1-2) in place of $Li_2S$ obtained in (2-1-1).

After pulverized, D50 of $P_2S_5$ was 8.7 μm.

(2-3) Production Example for Complex (1)

(2-3-1) Production Example for $Li_3PS_4$-TMEDA Complex (Complex (1)) Using N,N,N,N-tetramethylethane-1,2-Diamine (TMEDA) as Complexing Agent (1)

Figure 2:
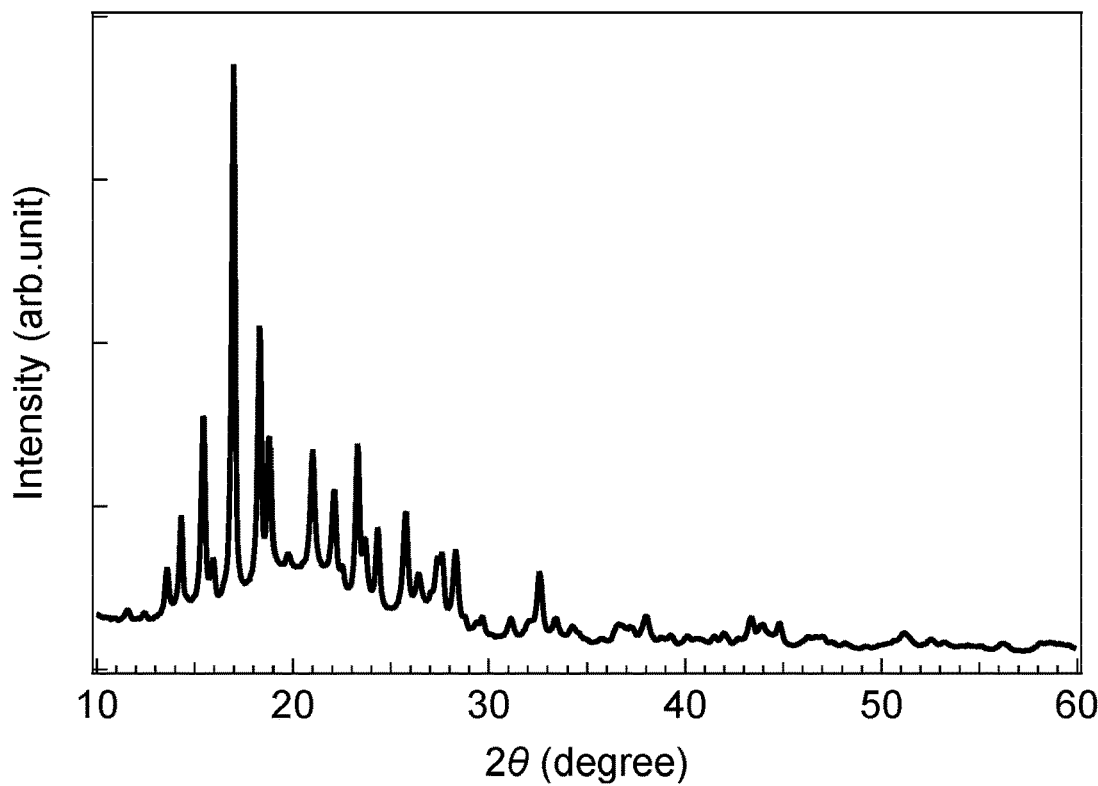
FIG. 2 This is an X-ray diffraction (XRD) spectrum (XRD pattern) of a TMEDA (N,N,N,N-tetramethylethane-1,2-diamine) complex of $Li_3PS_4$ ($Li_3PS_4$-TMEDA complex) obtained in Preparation Example in (2-3).

In an inert gas atmosphere in a glove box, $Li_2S$ obtained in (2-1-2) and $P_2S_5$ obtained in (2-2-1) were weighed in a molar ratio of 3/1 in a Schlenk bottle with a stirrer therein, totaling 10 g, and cooled with an acetone-liquid nitrogen mixture liquid. After cooled for 30 minutes, this was kept stirred with the stirrer, and 100 mL of tetrahydrofuran (THF) was put thereinto under a flow of an inert gas, and further stirred for 3 hours. The resultant slurry was filtered, then the resultant solid was washed repeatedly for a total of five times with THF, and the solvent was evaporated away in vacuum to give $Li_3PS_4$-3THF complex. The complex was dried in vacuum at 90° C. for 5 hours to give an amorphous g-$Li_3PS_4$. 5 g of the g-$Li_3PS_4$ was weighed in a Schlenk bottle with a stirrer therein, in an inert gas atmosphere in a glove box, and 20 mL of N,N,N,N-tetramethylethane-1,2-diamine (TMEDA) was put thereinto in a flow of an inert gas, and stirred. After this was reacted for 3 hours, the solvent was evaporated away in vacuum to give a $Li_3PS_4$-TMEDA complex (complex (1)) (its X-ray diffraction (XRD) spectrum is shown in FIG. 2).

(2-3-2) Production Example for $Li_3PS_4$-DME Complex (Complex (1)) Using Dimethoxyethane (DME) as Complexing Agent (1)

A $Li_3PS_4$-DME complex (complex (1)) was produced in the same manner as in (2-3-1) except that 20 mL of dimethoxyethane (DME) was used in place of TMEDA.

(3) Production Example for Complex (2)

(3-1) Pulverization of LiBr

LiBr (by Honjo Chemical Corporation, D50=38 μm) was pulverized in the same manner as in (2-1-2) in place of $Li_2S$ obtained in (2-1-1).

After pulverized, D50 of LiBr was 5.0 μm.

(3-2) Production Example for LiBr-TMEDA Complex (Complex (2)) Using TMEDA as Complexing Agent (2)

Figure 3:
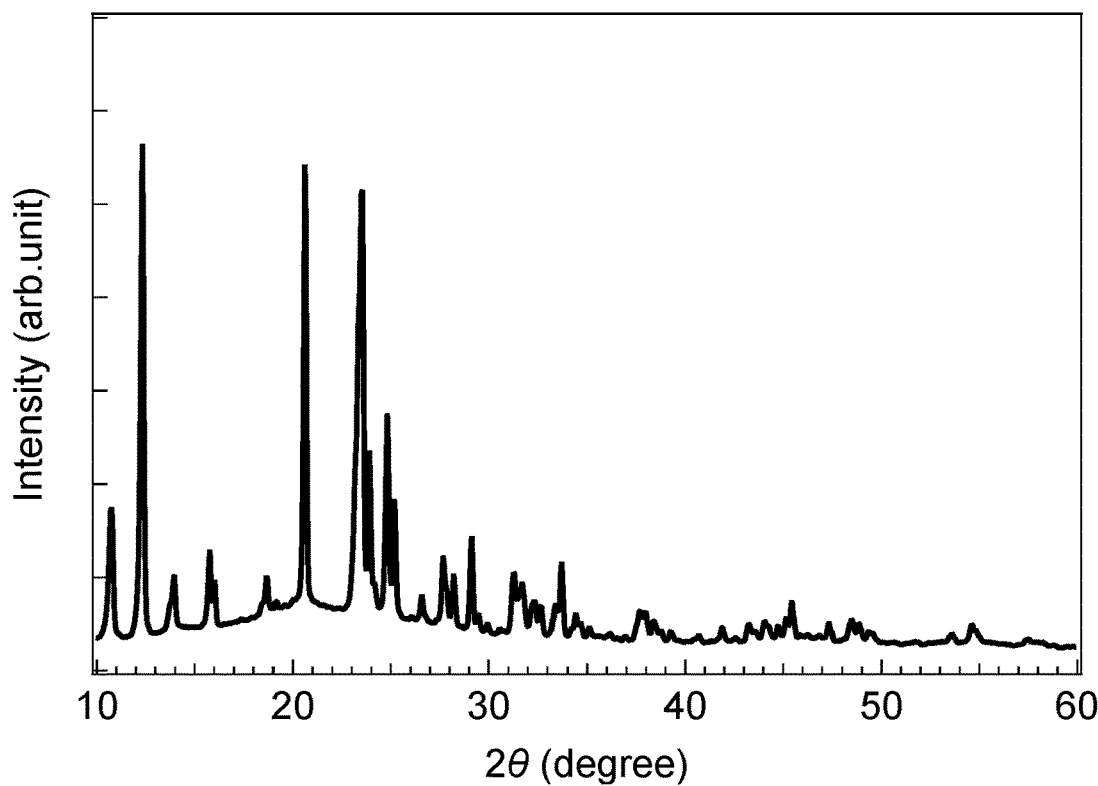
FIG. 3 This is an X-ray diffraction spectrum (XRD pattern) of a TMEDA complex of LiBr (LiBr-TMEDA complex) obtained in Preparation Example in (3-1).

In the same manner as in (2-3) except that 5 g of LiBr obtained in (3-1) was used in place of g-$Li_3PS_4$, a LiBr-TMEDA complex was produced (its X-ray diffraction (XRD) spectrum is shown in FIG. 3).

(3-3) Pulverization of LiI

LiI (by Sigma Aldrich Corporation, D50=308 μm) was pulverized in the same manner as in (2-1-2) in place of $Li_2S$ obtained in (2-1-1).

After pulverized, D50 of LiI was 10.0 μm.

(3-4-1) Production Example for LiI-TMEDA Complex (Complex (2)) Using TMEDA as Complexing Agent (2)

Figure 4:
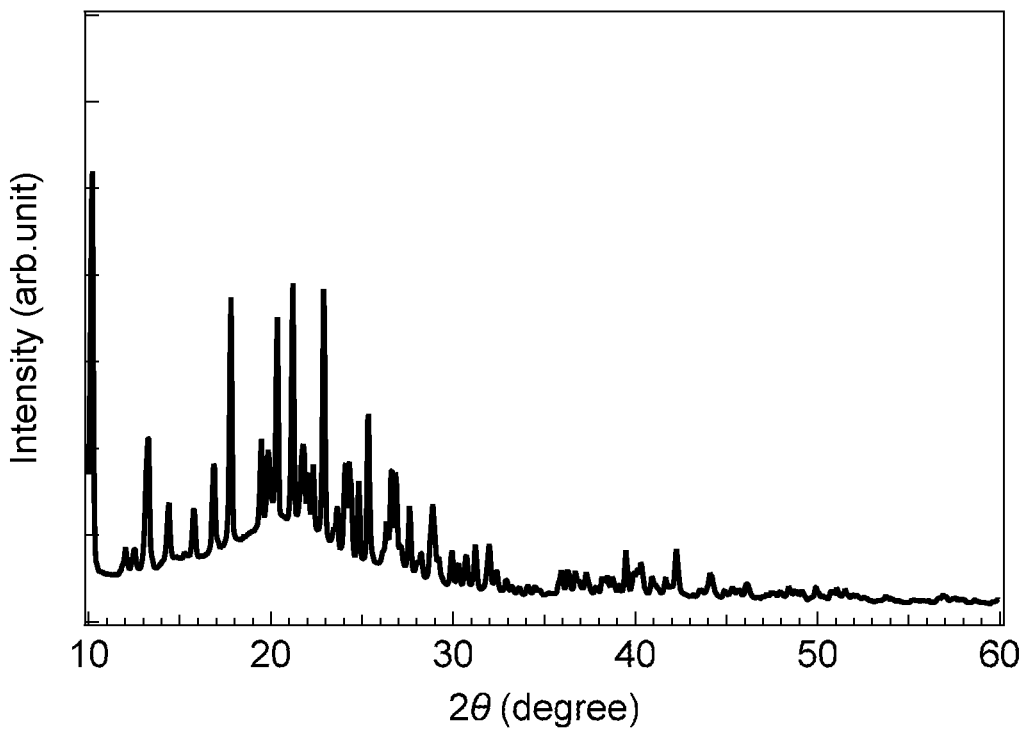
FIG. 4 This is an X-ray diffraction spectrum (XRD pattern) of a TMEDA complex of LiI (LiI-TMEDA complex) obtained in Preparation Example in (3-2).

In the same manner as in (2-3) except that 5 g of LiI obtained in (3-3) was used in place of $Li_2S$ and $P_2S_5$, a LiI-TMEDA complex (complex (2)) was produced (its X-ray diffraction (XRD) spectrum is shown in FIG. 4).

(3-2) Production Example for LiI-DME Complex (Complex (2)) Using DME as Complexing Agent (2)

In the same manner as in (3-4-1) except that 20 mL of DME was used in place of TMEDA, a LiI-DME complex (complex (2)) was produced.

Example 1

Figure 5:
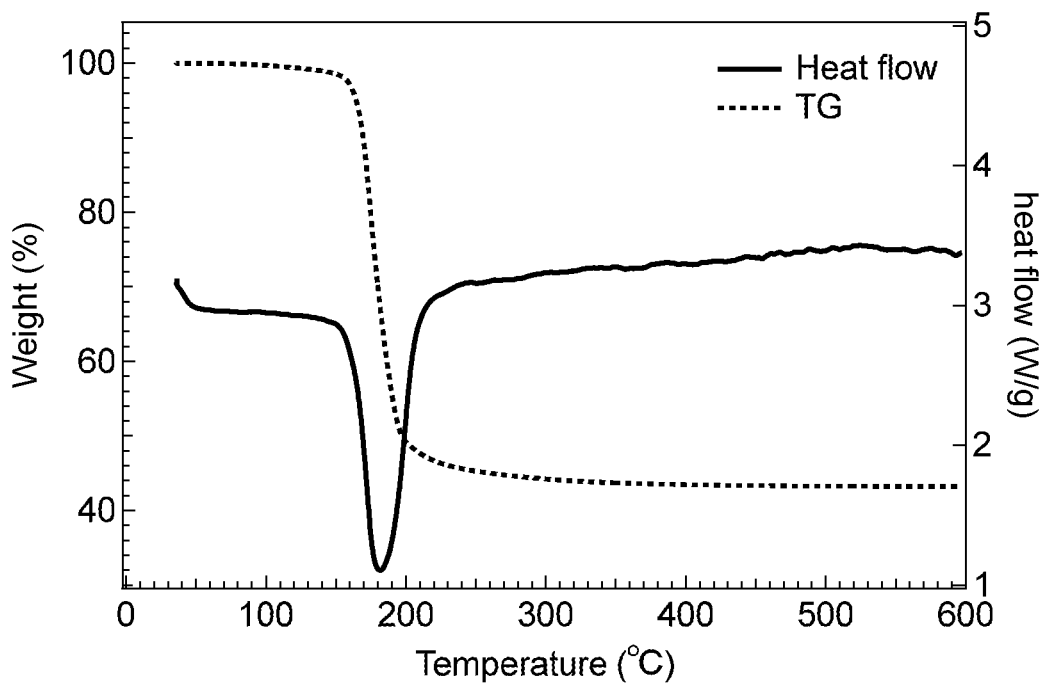
FIG. 5 This shows measurement results of TG (differential thermal)-DTA (thermogravimetry) of a $Li_3PS_4$-TMEDA complex obtained in Preparation Example in (2-3).
Figure 6:
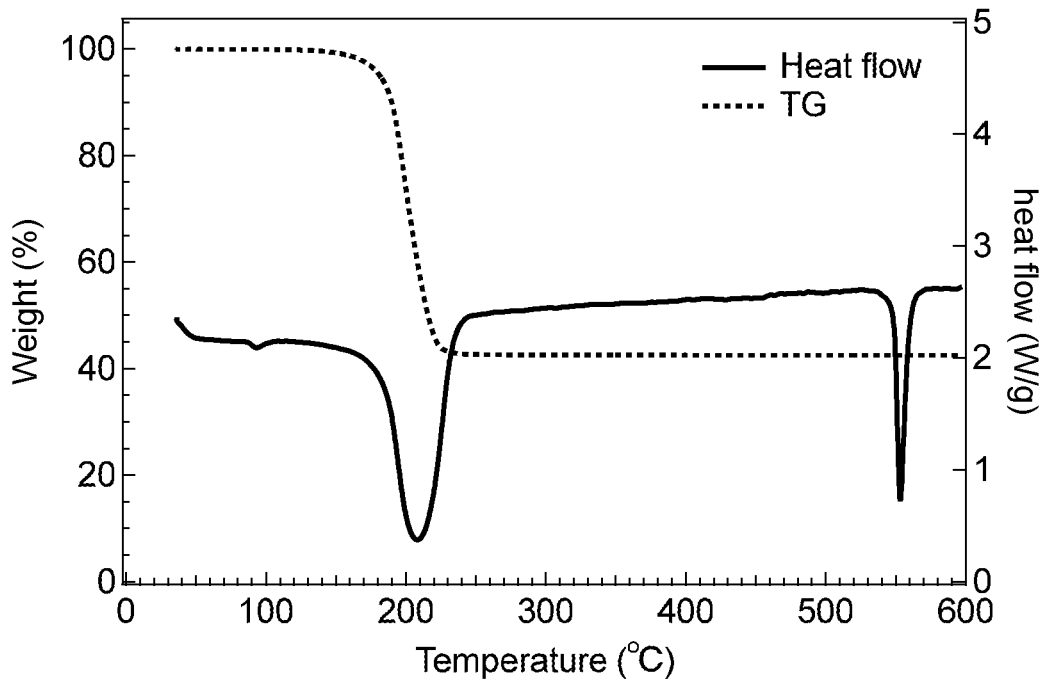
FIG. 6 This shows measurement results of TG (differential thermal)-DTA (thermogravimetry) of a LiBr-TMEDA complex obtained in Preparation Example in (3-1).
Figure 7:
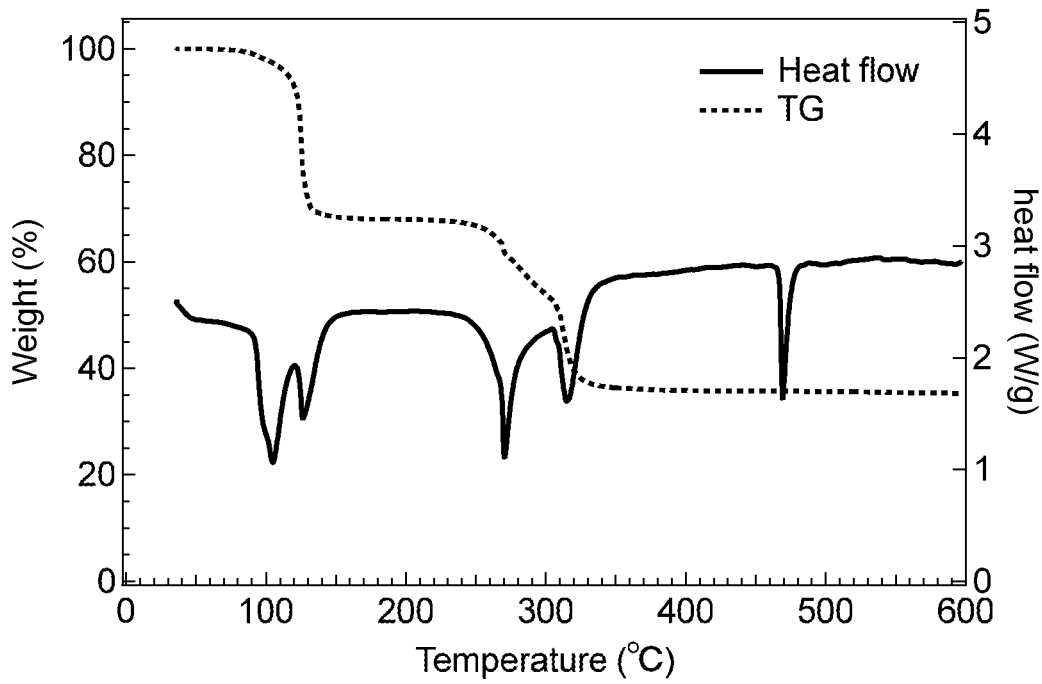
FIG. 7 This shows measurement results of TG (differential thermal)-DTA (thermogravimetry) of a LiI-TMEDA complex obtained in Preparation Example in (3-2).

The $Li_3PS_4$-TMEDA complex obtained in (2-3-1), the LiBr-TMEDA complex obtained in (3-2) and the LiI-TMEDA complex obtained in (3-4-1) were weighed in such a manner that, when the mass after weight reduction in TG-DTA (FIGS. 5, 6 and 7) is referred to as the mass of $Li_3PS_4$, the mass of LiBr and the mass of LiI, the molar ratio could be $Li_3PS_4$/LiBr/LiI=4/1/1, totaling 2.0 g, and in an inert gas atmosphere in a glove box, these were put into a zirconia ball mill pot (P-7, by Fritsch Japan Co., Ltd.) containing 34 g of 2 mmφ-zirconia balls therein, along with dewatered dibutyl ether (DBE FUJIFILM special grade chemical), and sealed up in an inert gas atmosphere in the glove box. The zirconia ball mill was driven for mixing at 200 rpm for 2 hours, and then the solvent was evaporated away in vacuum to give a precursor (1) (FIG. 8).

1.5 g of the resultant precursor (1) was weighed in a Schlenk bottle in an inert gas atmosphere in a glove box, then this was taken out of the glove box while keeping an inert gas atmosphere and was, in a reduced pressure condition at 10 Pa or less, heated at 180° C. for 2 hour to give a sulfide solid electrolyte (1). The XRD pattern of the sulfide solid electrolyte (1) is as in FIG. 9, from which the electrolyte is confirmed to contain a thio-LISICON Region II-type crystal structure. The ionic conductivity was 4.2 mS/cm.

Example 2

In an inert gas atmosphere in a glove box, 2.0 g of each TMEDA complex was weighed in a Schlenk bottle with a stirrer therein, like in Example 1, then 20 mL of dibutyl ether was added thereto in an inert gas atmosphere and stirred for 3 hours. Subsequently, the solvent was evaporated away in vacuum to give a precursor (2).

1.5 g of the resultant precursor (2) was weighed in a Schlenk bottle in an inert gas atmosphere in a glove box, then this was taken out of the glove box while keeping an inert gas atmosphere and was, in a reduced pressure condition at 10 Pa or less, heated at 180° C. for 2 hour to give a sulfide solid electrolyte (2). The XRD pattern of the sulfide solid electrolyte (2) is as in FIG. 9, from which the electrolyte is confirmed to contain a thio-LISICON Region II-type crystal structure. The ionic conductivity was 3.5 mS/cm.

Example 3

In an inert gas atmosphere in a glove box, 2.0 g of each TMEDA complex was weighed in a mortar, like in Example 1, and dry-mixed by mortar in an inert gas atmosphere for 30 minutes to give a precursor (3).

1.5 g of the resultant precursor (3) was weighed in a Schlenk bottle in an inert gas atmosphere in a glove box, then this was taken out of the glove box while keeping an inert gas atmosphere and was, in a reduced pressure condition at 10 Pa or less, heated at 180° C. for 2 hour to give a sulfide solid electrolyte (3). The XRD pattern of the sulfide solid electrolyte (3) is as in FIG. 9, from which the electrolyte is confirmed to contain a thio-LISICON Region II-type crystal structure. The ionic conductivity was 3.1 mS/cm.

Example 4

A sulfide solid electrolyte (4) was produced in the same manner as in Example 1, except that 0.5 mmφ-zirconia balls were used in place of 2 mmφ-zirconia balls. The XRD pattern of the sulfide solid electrolyte (4) is as in FIG. 10, from which the electrolyte is confirmed to contain a thio-LISICON Region II-type crystal structure. The ionic conductivity was 4.1 mS/cm.

Example 5

A sulfide solid electrolyte (5) was produced in the same manner as in Example 1, except that cyclohexane was used in place of dibutyl ether. The XRD pattern of the sulfide solid electrolyte (5) is as in FIG. 11, from which the electrolyte is confirmed to contain a thio-LISICON Region II-type crystal structure. The ionic conductivity was 3.5 mS/cm.

Examples 6 to 9

The $Li_3PS_4$-DME complex obtained in (2-3-2) and the LiI-DME complex obtained in (3-4-2) were used here. The amount of the $Li_3PS_4$-DME complex and the LiI-DME was controlled in such a manner that, when the mass after weight reduction in TG-DTA is referred to as the mass of $Li_3PS_4$ and the mass of LiI, the molar ratio $Li_3PS_4$/LiI could be as in Table 1, totaling 2.0 g, and these were introduced into a stirrer-equipped Schlenk bottle (volume: 100 mL). After the stirrer was rotated, 20 mL of dibutyl ether was added. Stirring was continued for 3 days, and then this was dried (room temperature: 23° C.) to give a powder. Further, the resultant powder was heated at 200° C. in vacuum for 6 hours to give a crystalline sulfide solid electrolyte. From the XRD patterns thereof, the crystal structure of the crystalline sulfide solid electrolytes obtained in Examples 6 to 8 was identified.

The crystalline sulfide solid electrolyte obtained in Example 6 was confirmed to contain a major part of a ß-$Li_3PS_4$ crystal structure and a $Li_4PS_4I$ crystal structure and contain a small amount of a thio-LISICON Region II-type crystal structure.

The crystalline sulfide solid electrolyte obtained in Example 7 was confirmed to have a $Li_4PS_4I$ crystal structure as a main phase and contain a minor part of a ß-$Li_3PS_4$ crystal structure and a thio-LISICON Region II-type crystal structure.

The crystalline sulfide solid electrolyte obtained in Example 8 was confirmed to have a $Li_4PS_4I$ crystal structure as a main phase and contain a minor part of a LiI crystal structure.

The ionic conductivity of the crystalline sulfide solid electrolytes obtained in Examples 6 to 8 is as in Table 1.

Comparative Example 1

Using "BEAD MILL LMZ015" (by Ashizawa Finetech Ltd.) as a bead mill, 485 g of zirconia balls having a diameter of 0.5 mm were adopted. A 2.0-liter agitator-equipped glass-made reactor was used as a reaction tank.

34.77 g of $Li_2S$ obtained in (2-1-2) and 45.87 g of $P_2S_5$ obtained in (2-2-1) were put into a reaction tank, and further 1000 mL of dewatered toluene was added thereto to give a slurry.

The slurry in the reaction tank was circulated at a flow rate of 600 mL/min, using a pump in the bead mill device, and the bead mill was started to be driven at a circumferential velocity of 10 m/s, and thereafter 13.97 g of iodine (special grade chemical, by FUJIFILM Wako Chemicals Corporation) and 13.19 g of bromine (special grade chemical, by FUJIFILM Wako Chemicals Corporation) dissolved in 200 mL of dewatered toluene were put into the reaction tank.

After completion of adding of iodine and bromine, the circumferential velocity of the bead mill was changed to 12 m/s, hot water (HW) was made to run therethrough by means of external circulation, and reaction was performed such that an ejection temperature of the pump was kept at 70° C. After removing a supernatant of the resultant slurry, the residue was placed on a hot plate and dried at 80° C., thereby giving a powdered amorphous sulfide solid electrolyte. The resultant powdered amorphous sulfide solid electrolyte was heated at 195° C. for 3 hours, using a hot plate installed in a glove box, thereby to give a crystalline sulfide solid electrolyte. The XRD pattern of the sulfide solid electrolyte is as in FIG. 9, from which the electrolyte is confirmed to contain a thio-LISICON Region II-type crystal structure. The ionic conductivity was 4.6 mS/cm.

From the results of the XRD patterns in FIGS. 9, 10 and 11, it is known that the sulfide solid electrolytes of Examples 1 to 5 have the same crystal structure as that of the sulfide solid electrolyte of Comparative Example 1.

Comparative Examples 2 to 4

In a nitrogen atmosphere, 15.3 g of the above-mentioned lithium sulfide, and 24.7 g of the above-mentioned diphosphorus pentasulfide were put into a 1-L stirrer-equipped reaction tank. The stirring impeller was driven, and then 400 mL of tetrahydrofuran previously cooled to −20° C. was introduced into the container. After spontaneously warmed up to room temperature (23° C.), this was kept stirred for 72 hours, and the resultant reaction liquid slurry was put into a glass filter (pore size: 40 to 100 μm) to collect a solid fraction. The solid fraction was dried at 90° C. to give 38 g of a white powder of $Li_3PS_4$ (purity: 90% by mass). In the XRD pattern, the resultant powder showed a halo pattern, and was confirmed to be an amorphous $Li_3PS_4$. The resultant $Li_3PS_4$ does not contain a complexing agent as a constituent component.

In a nitrogen atmosphere, the above-mentioned amorphous $Li_3PS_4$ and the pulverized LiI obtained in (3-3) were put into a stirrer-equipped Schlenk (volume: 100 mL) in such a manner that the molar ratio $Li_3PS_4$/LiI could be as in Table 1, totaling 2.0 g. The stirrer was rotated, and then 20 mL of a complexing agent, DME was added. After stirring was continued for 3 hours, this was dried at 50° C. (room temperature: 23° C.) to give a powder. Further, the resultant powder was heated at 200° C. in vacuum for 6 hours to give a crystalline sulfide solid electrolyte. From the XRD patterns thereof, the crystal structure of the crystalline sulfide solid electrolytes obtained in Comparative Examples 2 to 4 was confirmed.

The crystalline sulfide solid electrolyte of Comparative Example (2) was confirmed to contain a major part of a ß-$Li_3PS_4$ crystal structure and a $Li_4PS_4I$ crystal structure and contain a small amount of a thio-LISICON Region II-type crystal structure.

The crystalline sulfide solid electrolyte of Comparative Example (3) was confirmed to have a Li$_4$PS$_4$I crystal structure as a main phase and contain a minor part of a ß-Li$_3$PS$_4$ crystal structure and a LiI crystal structure.

The crystalline sulfide solid electrolyte of Comparative Example (4) was confirmed to have a Li$_4$PS$_4$I crystal structure as a main phase and contain a minor part of a LiI crystal structure.

The ionic conductivity of the crystalline sulfide solid electrolytes of Examples (2) to (4) is as in Table 1.

TABLE 1

|  | Li$_3$PS$_4$:LiI | Ionic Conductivity (mS/cm) |
| --- | --- | --- |
| Example 6 | 4:1 | 0.76 |
| Comparative Example 2 |  | 0.52 |
| Example 7 | 2:1 | 0.85 |
| Comparative Example 3 |  | 0.5 |
| Example 8 | 1:1 | 0.39 |
| Comparative Example 4 |  | 0.31 |

As shown in Examples 1 to 3, the case of a complex of the complex (1) and the complex (2) containing TMEDA as a constituent element can provide a sulfide solid electrolyte having an extremely high ionic conductivity as compared with a solid electrolyte obtained according to the method of PTL 1. In particular, it is known that, even in a simplified method of Example 2 (mixing not using a pulverizer) and Example 3 (dry mixing not using a solvent), a sulfide solid electrolyte having a high ionic conductivity can be obtained.

Further, it is known that, even when the mixing condition is varied (Example 4), or the solvent to be used is changed (Example 5), a sulfide solid electrolyte having a high ionic conductivity can also be obtained.

The solid electrolytes obtained in Comparative Examples 2 to 4 use DME as a complexing agent like in the production method described in PTL 4, but these are solid electrolytes obtained not via the complexes (1) and (2) unlike in the present embodiment. According to these production methods, stirring for a total of 84 hours was necessary. As opposed to this, even in the case of using the complex (1) and the complex (2) containing DME as a constituent element, like in Examples 6 to 8, sulfide solid electrolytes could be obtained within an extremely shorter period of time than in Comparative Examples 2 to 4. In addition, regarding ionic conductivity, the sulfide solid electrolytes (6) to (8) have a higher ionic conductivity than the crystalline sulfide solid electrolytes obtained in the corresponding Comparative Examples (2) to (4).

(Reference: Exposure Test)

Figure 12:
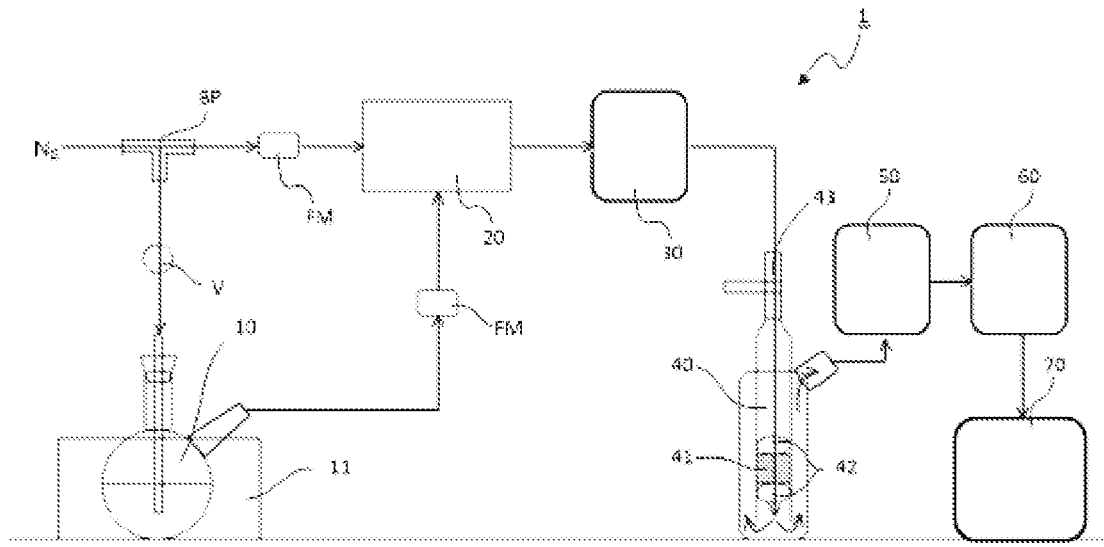
FIG. 12 This is a diagrammatic configuration diagram of a test apparatus used in an exposure test.

First of all, a testing apparatus to be used for the exposure test (exposure testing apparatus 1) is explained by reference to FIG. 12.

The exposure testing apparatus 1 includes, as main structural elements, a flask 10 for humidifying nitrogen; a static mixer 20 for mixing humidified nitrogen and non-humidified nitrogen; a dew point meter 30 for measuring the moisture of mixed nitrogen (M170/DMT152, by VAISALA KK); a dual reaction pipe 40 for installing a measuring sample; a dew point meter 50 for measuring the moisture of nitrogen discharged from the dual reaction pipe 40; and a hydrogen sulfide measurement analyzer 60 for measuring the concentration of hydrogen sulfide contained in discharged nitrogen (Model 3000RS, by AMI), and these are connected with each other using tubes (not illustrated). A temperature of the flask 10 is set to 10° C. by a cooling tank 11.

For the tubes for connecting the respective structural elements, a Teflon (registered trademark) tube having a diameter of 6 mm was used. In this figure, expressions of the tubes are omitted, and instead thereof, the flows are expressed using arrows.

The procedures of evaluation are as follows.

In a nitrogen glow box set to a dew point of −80° C., about 1.5 g of a powdered sample 41 was weighed and installed in the inside of the reaction pipe 40 such that it was sandwiched by quartz wools 42, followed by hermetically sealing. The evaluation was performed at room temperature (20° C.).

Nitrogen was fed at 0.02 MPa into the apparatus 1 from a nitrogen source (not illustrated). The fed nitrogen passes through a bifurcation pipe BP, and a part thereof is fed into the flask 10 and humidified. The other is fed as non-humidified nitrogen directly into the static mixer 20. The feed amount of nitrogen into the flask 10 is adjusted by a needle valve V.

By adjusting a flow rate of each of the non-humidified nitrogen and the humidified nitrogen by a needle valve-provided flow meter FM, the dew point is controlled. Specifically, into the static mixer 20, the non-humidified nitrogen was fed at a flow rate of 800 mL/min, whereas the humidified nitrogen was fed at a flow rate of 10 to 30 mL/min. The both were mixed, and a dew point of the mixed gas (a mixture of the non-humidified nitrogen and the humidified nitrogen) was confirmed with the dew point meter 30.

After adjusting the dew point to −30° C., a three-way cock 43 was rotated, and the mixed gas was passed through the inside of the reaction pipe 40 for 2 hours. The amount of hydrogen sulfide contained in the mixed gas having passed through the sample 41 was measured with the hydrogen sulfide measurement analyzer 60. The amount of hydrogen sulfide was recorded at 15 minute intervals. In addition, for reference, a dew point of the mixed gas after exposure was measured with the dew point meter 50.

In order to remove hydrogen sulfide from the nitrogen after measurement, the resulting mixed gas was passed through an alkali trap 70.

Figure 13:
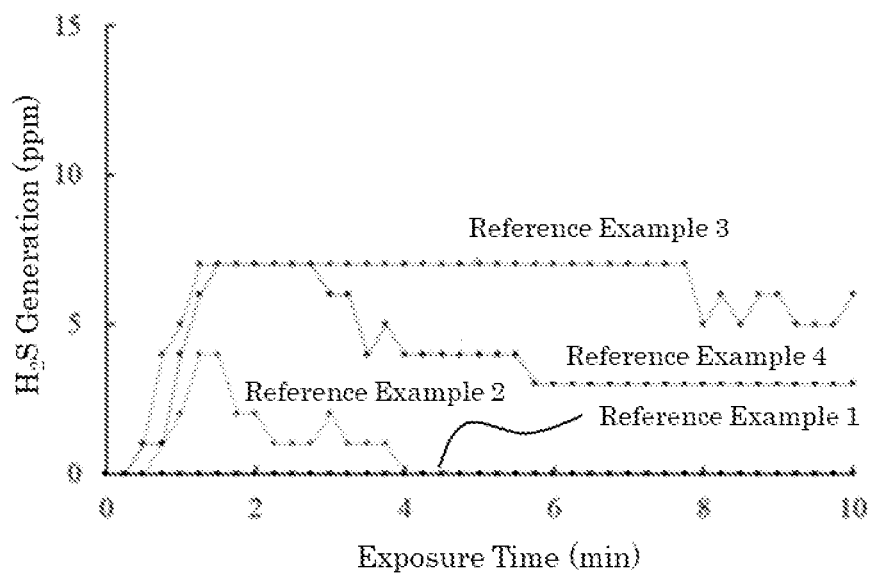
FIG. 13 This is a graph showing a change with time of generation amount of hydrogen sulfide in an exposure test.
Figure 14:
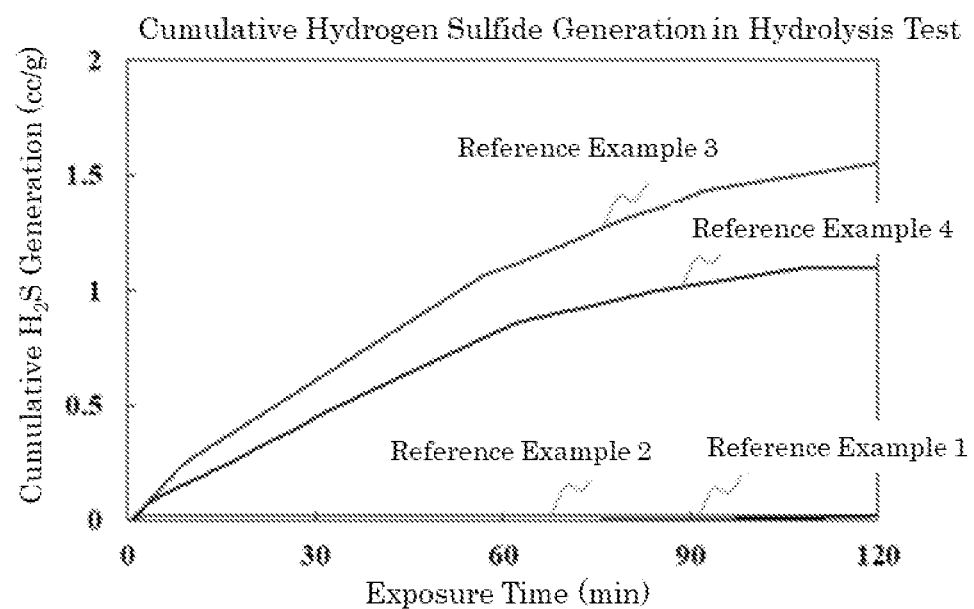
FIG. 14 This is a graph showing a change with time of cumulative generation amount of hydrogen sulfide in an exposure test.

With respect to the crystalline sulfide solid electrolyte obtained in the following Reference Example 1, the amorphous Li$_3$PS$_4$ obtained in Reference Example 2, and the crystalline sulfide solid electrolytes obtained in the following Reference Examples 3 and 4, an exposure test was performed according to the aforementioned exposure test method. A graph expressing a change with time of generation amount of hydrogen sulfide at an exposure time as measured at all times is shown in FIG. 13, and a graph expressing a change with time of cumulative generation amount of hydrogen sulfide at an exposure time is shown in FIG. 14.

Reference Example 1

A precursor, an amorphous sulfide solid electrolyte, and a crystalline sulfide solid electrolyte were obtained in the same manner as in Example 1, except that in Example 1, 1.70 g of the white powder produced in the following Reference Example 2 (Li$_3$PS$_4$: 1.53 g), 0.19 g of lithium bromide and 0.28 g of lithium bromide were used, and the amount of the complexing agent used was 4.4 mL, and 15.6 mL of dibutyl ether was used as the solvent, and the stirring time was 24 hours. The resultant crystalline sulfide solid electrolyte was analyzed through powdery X-ray diffractometry (XRD) in the same manner as in Example 1, and was confirmed to have a thio-LISICON Region II-type crystal structure. The ionic conductivity thereof was 4.3 mS/cm, that is, the crystalline sulfide solid electrolyte was confirmed to have a high ionic conductivity. In the present Reference Example 1, the complexes were not mixed, and therefore a long time was taken in stirring, but the precursor, the amorphous sulfide solid electrolyte, and the crystalline sulfide solid electrolyte were the same as those to be produced in the present embodiment.

Reference Example 2

In a one-liter impeller-provided reaction tank, 15.3 g of lithium sulfide and 24.7 g of diphosphorus pentasulfide were added in a nitrogen atmosphere. After actuating the impeller, 400 mL of tetrahydrofuran which had been previously cooled to −20° C. was introduced into the container. After naturally raising the temperature to room temperature (23° C.), agitation was continued for 72 hours, the obtained reaction liquid slurry was charged in a glass filter (pore size: 40 to 100 μm) to obtain a solid component, and then, the solid component was dried at 90° C., thereby obtaining 38 g of $Li_3PS_4$ (purity: 90% by mass) as a white powder. The resultant powder was subjected to powdery X-ray diffractometry (XRD) with an X-ray diffraction (XRD) apparatus (SmartLab apparatus, manufactured Rigaku Corporation). As a result, the foregoing powder expressed a halo pattern and confirmed to be amorphous $Li_3PS_4$.

Reference Example 3

Using "BEAD MILL LMZ015" (by Ashizawa Finetech Ltd.) as a bead mill, 485 g of zirconia balls having a diameter of 0.5 mm were used. A 2.0-liter agitator-equipped glass-made reactor was used as a reaction tank.

29.66 g of lithium sulfide, 47.83 g of diphosphorus pentasulfide, 14.95 g of lithium bromide, 15.36 g of lithium iodide, and 1,200 mL of dehydrated toluene were adopted in the reaction tank, to prepare a slurry. The slurry adopted in the reaction tank was circulated at a flow rate of 600 mL/min by using a pump within the bead mill apparatus; an operation of the bead mill was commenced at a circumferential velocity of 10 m/s; the circumferential velocity of the bead mill was changed to 12 m/s; hot water (HW) was passed therethrough by means of external circulation; and reaction was performed such that an ejection temperature of the pump was kept at 70° C. After removing a supernatant of the obtained slurry, the residue was placed on a hot plate and dried at 80° C., thereby obtaining a powdered amorphous sulfide solid electrolyte. The resultant powdered amorphous sulfide solid electrolyte was heated at 195° C. for 3 hours by using a hot plate installed within a globe box, thereby giving a crystalline sulfide solid electrolyte. The resultant crystalline sulfide solid electrolyte was subjected to powder X-ray diffractometry (XRD), and was confirmed to have a thio-LISICON Region II-type crystal structure.

Reference Example 4

Using "BEAD MILL LMZ015" (by Ashizawa Finetech Ltd.) as a bead mill, 485 g of a zirconia ball having a diameter of 0.5 mm was adopted. A 2.0-liter agitator-provided glass-made reactor was used as a reaction tank.

34.77 g of lithium sulfide and 45.87 g of diphosphorus pentasulfide were added in the reaction tank, and 1,000 mL of dehydrated toluene was further added to prepare a slurry. The slurry added in the reaction tank was circulated at a flow rate of 600 mL/min by using a pump within the bead mill apparatus; an operation of the bead mill was commenced at a circumferential velocity of 10 m/s; and then, 13.97 g of iodine (by FUJIFILM Wako Pure Chemicals Corporation, special grade chemical) and 13.19 g of bromine (by FUJIFILM Wako Pure Chemicals Corporation, special grade chemical) dissolved in 200 mL of dehydrated toluene were added in the reaction tank.

After completion of adding of iodine and bromine, the circumferential velocity of the bead mill was changed to 12 m/s; hot water (HW) was passed therethrough by means of external circulation; and reaction was performed such that an ejection temperature of the pump was kept at 70° C. After removing a supernatant of the obtained slurry, the residue was placed on a hot plate and dried at 80° C., thereby obtaining a powdered amorphous sulfide solid electrolyte. The resultant powdered amorphous sulfide solid electrolyte was heated at 195° C. for 3 hours by using a hot plate installed within a globe box, thereby giving a crystalline sulfide solid electrolyte. The resultant crystalline sulfide solid electrolyte was subjected to powder X-ray diffractometry (XRD), and was confirmed to have a thio-LISICON Region II-type crystal structure.

It was confirmed that the amorphous $Li_3PS_4$ obtained in Reference Example 2, the crystalline solid electrolyte obtained in Reference Example 3 by a conventional solid-phase method (mechanical milling method), and the crystalline solid electrode obtained in Reference Example 4 using a halogen simple substance as the raw material generated hydrogen sulfide in an amount of at most 7 ppm, and the cumulative generation amount thereof after 120 minutes was more than 1 cc/g, whereas it was confirmed that the solid electrolyte obtained in Reference Example 1 using the same precursor as in the present embodiment generated little hydrogen sulfide.

INDUSTRIAL APPLICABILITY

In accordance with the production method of a sulfide solid electrolyte of the present embodiment, a crystalline sulfide solid electrolyte which is high in the ionic conductivity and excellent in the battery performance and is able to suppress the generation of hydrogen sulfide can be produced.

The crystalline sulfide solid electrolyte obtained by the production method of the present embodiment is suitably used for batteries, especially batteries to be used for information-related instruments, communication instruments, and so on, such as personal computers, video cameras, and mobile phones.

The invention claimed is:

1. A method for producing a sulfide solid electrolyte containing a lithium atom, a sulfur atom, a phosphorus atom, and a halogen atom, the method comprising:

mixing and reacting a complex (1) with a separate complex (2);

wherein:

the complex (1) contains a sulfide containing a lithium atom, a sulfur atom, and a phosphorus atom as constituent elements; and the complex (2) contains a halide containing a lithium atom and a halogen atom as constituent elements;

and wherein:

the sulfide solid electrolyte does not have a diffraction peak at $2\theta=17.5°$ and $26.1°$ corresponding to a crystalline $Li_3PS_4$, in X-ray diffractometry using a CuKα ray.

2. The method for producing a sulfide solid electrolyte according to claim 1, further comprising heating after mixing the complex (1) and the complex (2).

3. The method for producing a sulfide solid electrolyte according to claim 2, wherein the heating is carried out at 90 to 250° C.

4. The method for producing a sulfide solid electrolyte according to claim 2, wherein the heating is carried out at 0.1 to 100.0 Pa.

5. The method for producing a sulfide solid electrolyte according to claim 1, wherein the mixing is carried out in a solvent.

6. The method for producing a sulfide solid electrolyte according to claim 1, wherein the mixing is carried out using a pulverizer.

7. The method for producing a sulfide solid electrolyte according to claim 1, wherein the sulfide contains at least one selected from the group consisting of an amorphous $Li_3PS_4$ and a crystalline $Li_3PS_4$.

8. The method for producing a sulfide solid electrolyte according to claim 1, wherein the complex (1) further contains a complexing agent (1) as a constituent element, and the complex (2) further contains a complexing agent (2) as a constituent element.

9. The method for producing a sulfide solid electrolyte according to claim 8, wherein the complexing agent (1) and the complexing agent (2) each independently contain a hetero atom-containing compound.

10. The method for producing a sulfide solid electrolyte according to claim 8, wherein the complexing agent (1) and the complexing agent (2) each independently contain a compound having at least one amino group or ether bond.

11. The method for producing a sulfide solid electrolyte according to claim 8, wherein the complexing agent (1) and the complexing agent (2) each independently contain a compound having at least 2 tertiary amino groups.

12. The method for producing a sulfide solid electrolyte according to claim 8, wherein the mixing comprises mixing the complex (1) and the complex (2) to obtain a precursor containing the complexing agent (1), the complexing agent (2), a lithium atom, a sulfur atom, a phosphorus atom, and a halogen atom as constituent elements.

13. The method for producing a sulfide solid electrolyte according to claim 12, wherein a total content of the complex (1) and the complex (2) in the precursor s 30 to 80% by mass based on a total amount of the precursor.

14. The method for producing a sulfide solid electrolyte according to claim 5, wherein the solvent comprises at least one selected from the group consisting of an aliphatic hydrocarbon solvent, an alicyclic hydrocarbon solvent, an aromatic hydrocarbon solvent, and an ether solvent.

15. The method for producing a sulfide solid electrolyte according to claim 5, wherein the solvent is used in an amount of 5 to 50 mL relative to 1 g of a total mass of the complex (1) and the complex (2).

16. The method for producing a sulfide solid electrolyte according to claim 1, wherein the sulfide solid electrolyte contains a thio-LISICON Region II-type crystal structure.

* * * * *